US012608475B2

(12) United States Patent
Hughes et al.

(10) Patent No.: US 12,608,475 B2
(45) Date of Patent: Apr. 21, 2026

(54) DATA SECURITY TRANSACTIONS USING SOFTWARE CONTAINER MACHINE READABLE CONFIGURATION DATA

(71) Applicant: Sylabs IP Holdings, LLC, Series F, Reno, NV (US)

(72) Inventors: Adam Hughes, Ottawa (CA); Adrian Wobito, Pefferlaw (CA); Dmytro Harkavyi, Slavutych (UA); Michael Frisch, Innisfil (CA)

(73) Assignee: Sylabs, Inc., Reno, NV (US)

( * ) Notice: Subject to any disclaimer, the term of this patent is extended or adjusted under 35 U.S.C. 154(b) by 0 days.

(21) Appl. No.: 18/740,442

(22) Filed: Jun. 11, 2024

(65) Prior Publication Data

US 2025/0378169 A1     Dec. 11, 2025

(51) Int. Cl.
*G06F 21/57* (2013.01)

(52) U.S. Cl.
CPC ........ *G06F 21/57* (2013.01); *G06F 2221/033* (2013.01)

(58) Field of Classification Search
CPC ........................... G06F 21/57; G06F 2221/033
See application file for complete search history.

(56) References Cited

U.S. PATENT DOCUMENTS

| | | | | |
|---|---|---|---|---|
| 10,055,578 | B1 * | 8/2018 | Marquardt | .............. G06F 21/44 |
| 10,534,915 | B2 * | 1/2020 | Cherny | ................ G06F 21/577 |
| 11,416,587 | B1 * | 8/2022 | den Hartog | ............. G06F 21/53 |
| 11,461,460 | B2 * | 10/2022 | El-Moussa | .............. G06F 21/53 |
| 11,550,903 | B1 * | 1/2023 | Epstein | ................... G06F 21/57 |
| 11,580,230 | B2 * | 2/2023 | Bhatt | ....................... G06F 21/52 |
| 11,762,986 | B2 * | 9/2023 | Gerebe | ................... G06F 21/54 726/1 |
| 11,829,485 | B2 * | 11/2023 | Karri | ......................... G06F 8/63 |
| 12,013,928 | B2 * | 6/2024 | Cherny | ................ G06F 21/604 |
| 2017/0098071 | A1 * | 4/2017 | Stopel | ................ G06F 21/554 |
| 2018/0260574 | A1 * | 9/2018 | Morello | .............. G06F 9/44505 |
| 2019/0156023 | A1 * | 5/2019 | Gerebe | ................... G06F 21/51 |
| 2019/0303541 | A1 * | 10/2019 | Reddy | ..................... G06F 21/64 |
| 2019/0303579 | A1 * | 10/2019 | Reddy | ................... H04L 9/3239 |
| 2023/0037616 | A1 * | 2/2023 | Karri | ....................... G06F 21/53 |
| 2023/0275917 | A1 * | 8/2023 | Karmali | ............. G06F 16/9537 709/224 |
| 2024/0211608 | A1 * | 6/2024 | Rogers | .................. G06F 21/577 |
| 2024/0329953 | A1 * | 10/2024 | Cliffe | ..................... G06F 8/433 |

* cited by examiner

*Primary Examiner* — Michael Won

(57) ABSTRACT

Techniques for data security transactions using software container machine readable configuration data are described, including receiving at a platform in response to a query, an artifact associated with a software container, parsing the artifact to identify source code of the software container and a supply chain, invoking a scoring engine configured to generate a score associated with a component of the software container and an aggregate score of the software container, the aggregate score being based on a security tool being included with the software container, and generating a report from the platform, the report being associated with the software container and the report including an attestation comprising the score and the aggregate score.

20 Claims, 18 Drawing Sheets

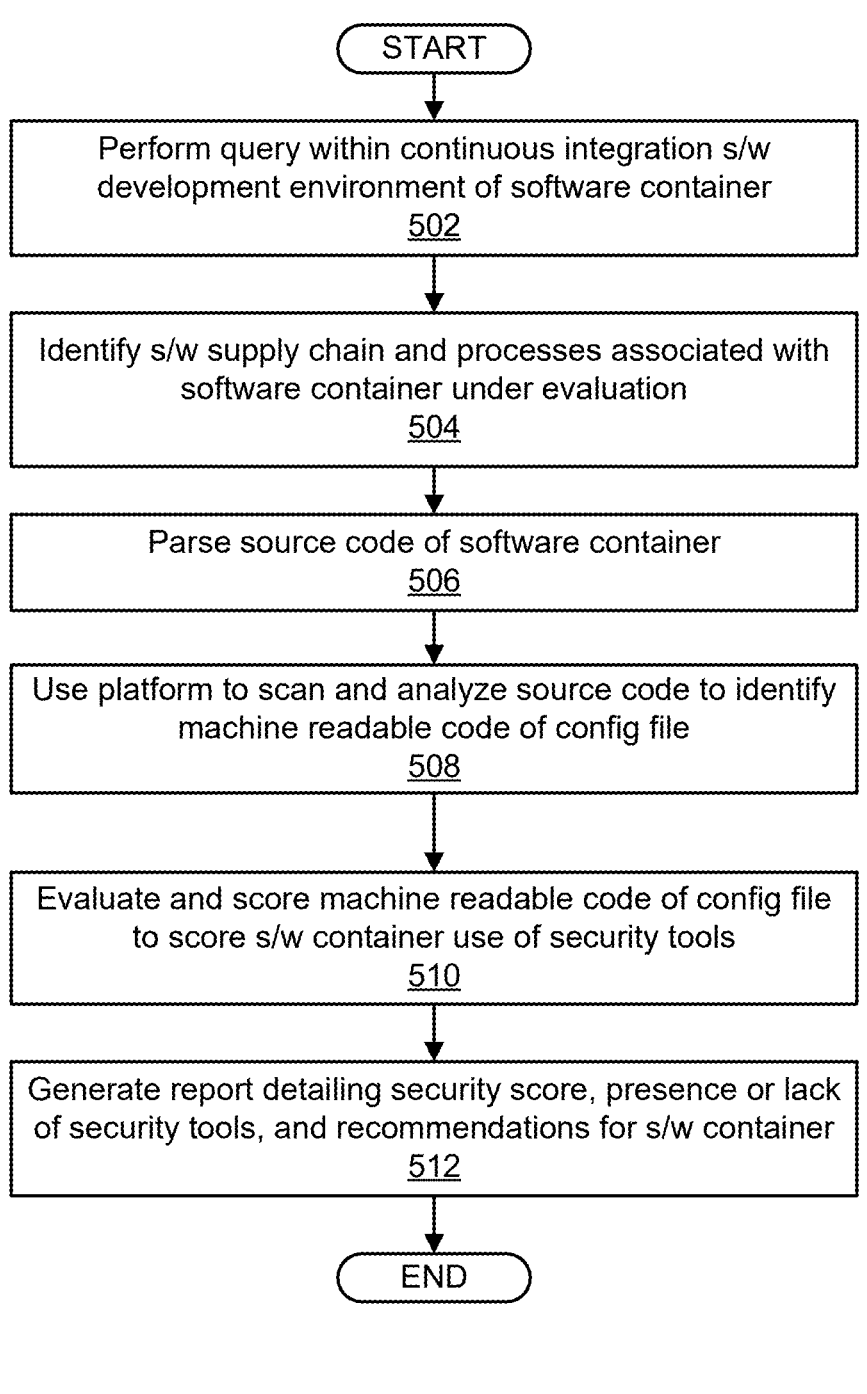

START

Perform query within continuous integration s/w
development environment of software container
502

Identify s/w supply chain and processes associated with
software container under evaluation
504

Parse source code of software container
506

Use platform to scan and analyze source code to identify
machine readable code of config file
508

Evaluate and score machine readable code of config file
to score s/w container use of security tools
510

Generate report detailing security score, presence or lack
of security tools, and recommendations for s/w container
512

END

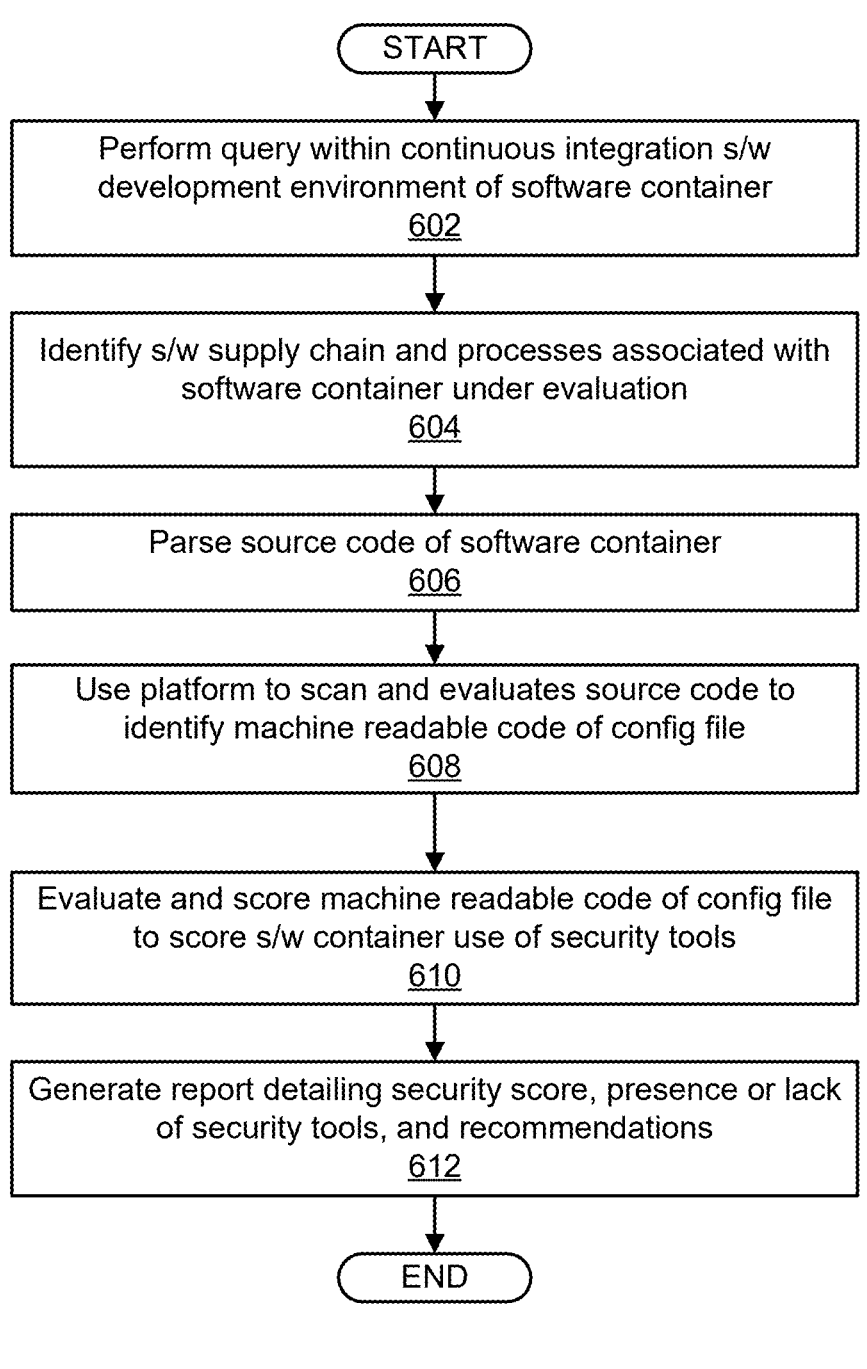

START

Perform query within continuous integration s/w development environment of software container
602

Identify s/w supply chain and processes associated with software container under evaluation
604

Parse source code of software container
606

Use platform to scan and evaluates source code to identify machine readable code of config file
608

Evaluate and score machine readable code of config file to score s/w container use of security tools
610

Generate report detailing security score, presence or lack of security tools, and recommendations
612

END

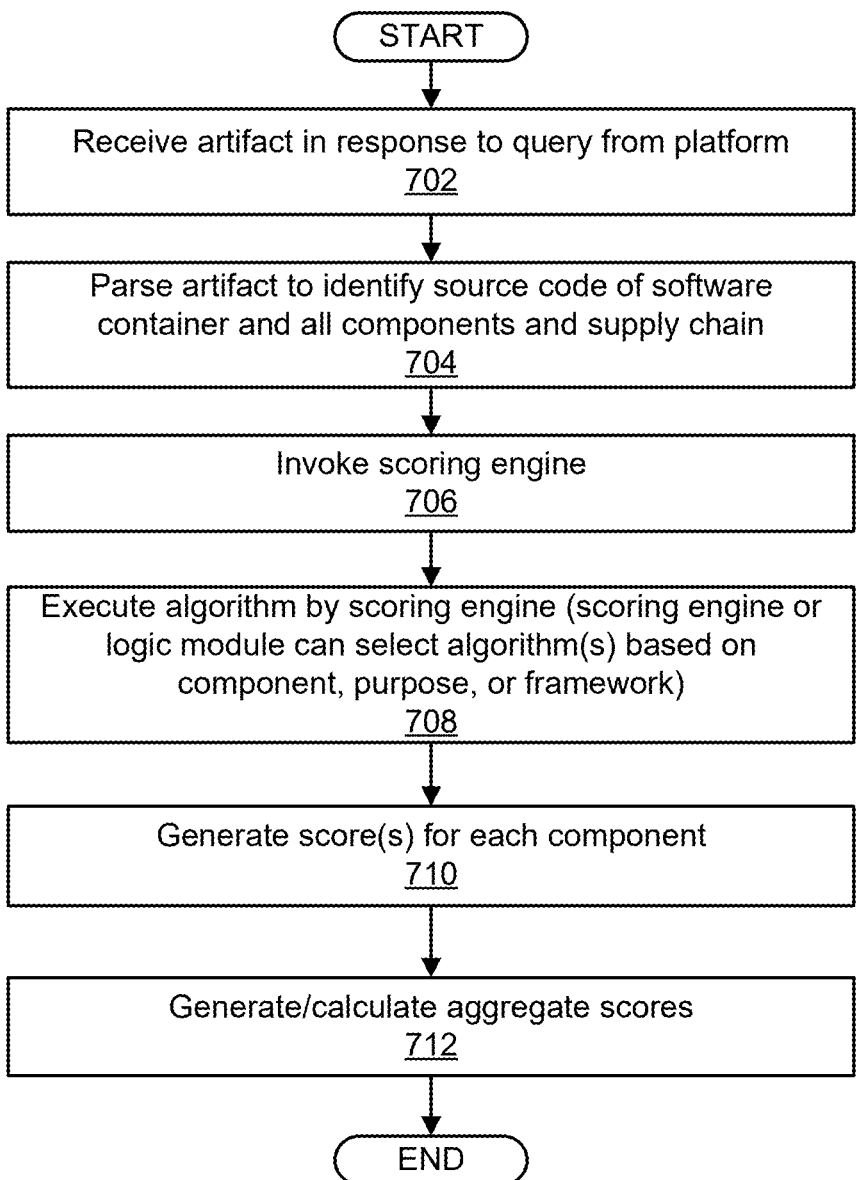

START

Receive artifact in response to query from platform
702

Parse artifact to identify source code of software
container and all components and supply chain
704

Invoke scoring engine
706

Execute algorithm by scoring engine (scoring engine or
logic module can select algorithm(s) based on
component, purpose, or framework)
708

Generate score(s) for each component
710

Generate/calculate aggregate scores
712

END

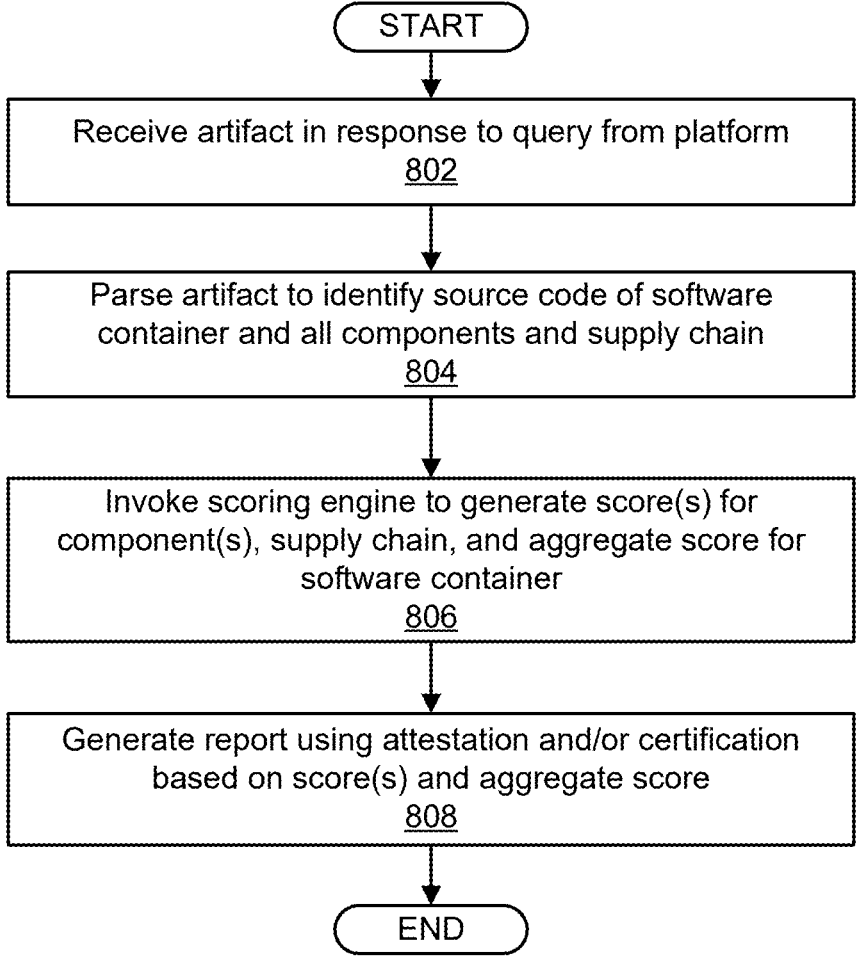

START

Receive artifact in response to query from platform
802

Parse artifact to identify source code of software
container and all components and supply chain
804

Invoke scoring engine to generate score(s) for
component(s), supply chain, and aggregate score for
software container
806

Generate report using attestation and/or certification
based on score(s) and aggregate score
808

END

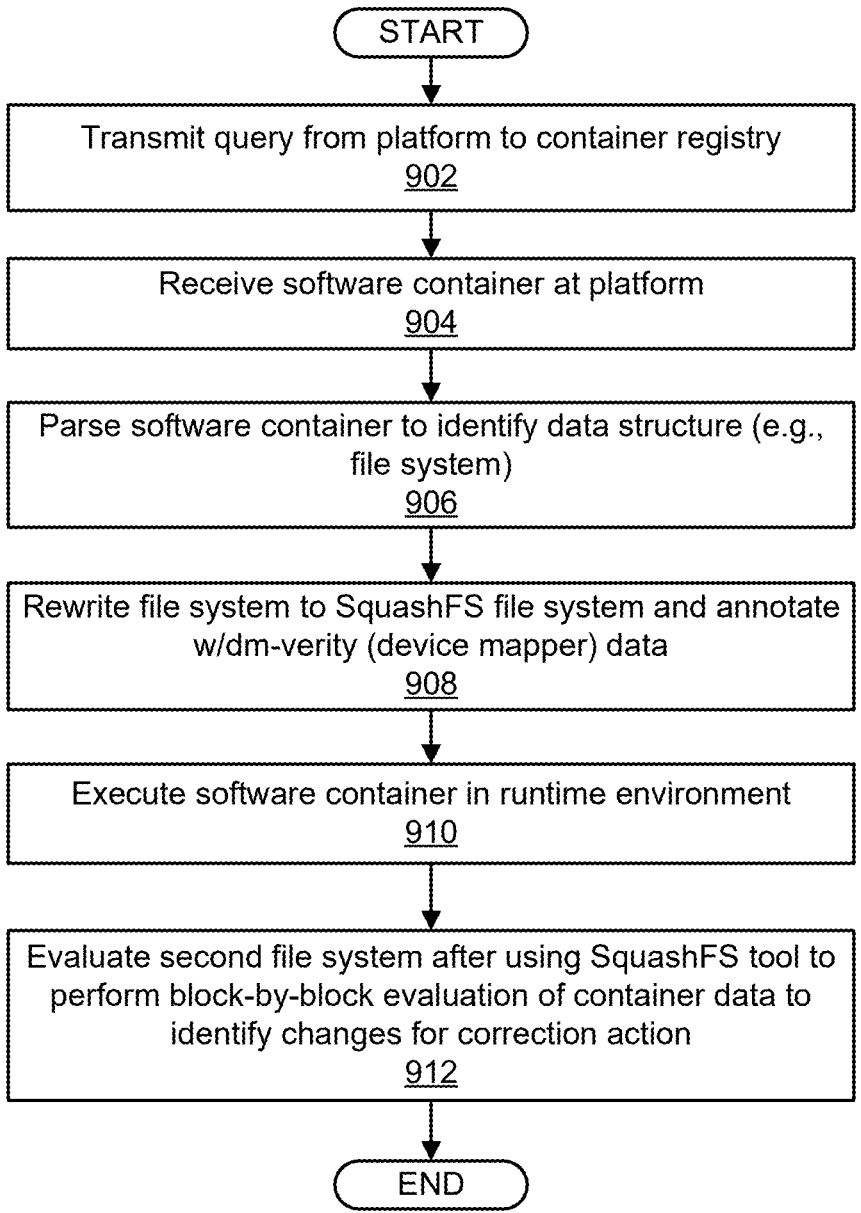

START

Transmit query from platform to container registry
902

Receive software container at platform
904

Parse software container to identify data structure (e.g., file system)
906

Rewrite file system to SquashFS file system and annotate w/dm-verity (device mapper) data
908

Execute software container in runtime environment
910

Evaluate second file system after using SquashFS tool to perform block-by-block evaluation of container data to identify changes for correction action
912

END

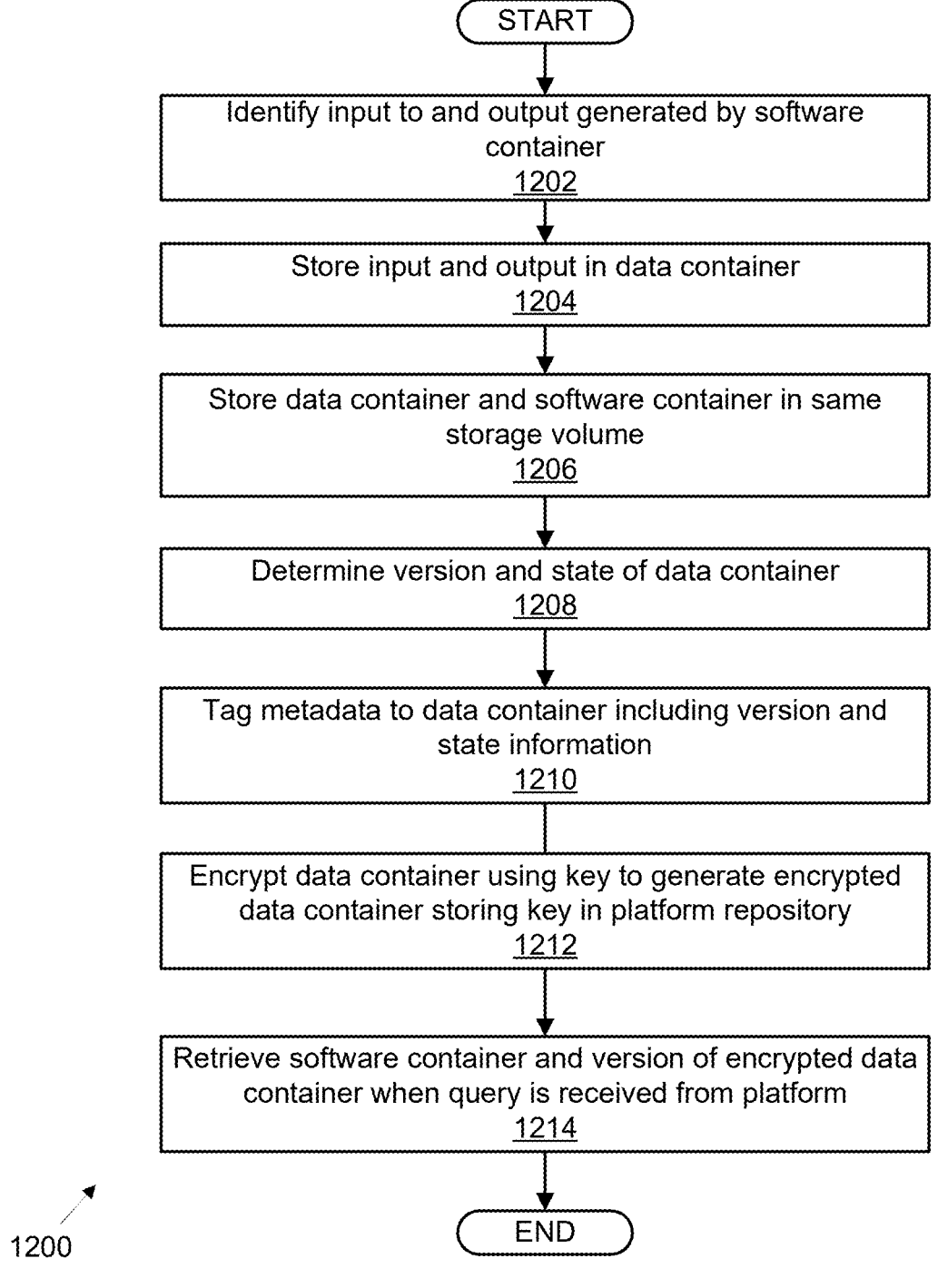

START

Identify input to and output generated by software container
1202

Store input and output in data container
1204

Store data container and software container in same storage volume
1206

Determine version and state of data container
1208

Tag metadata to data container including version and state information
1210

Encrypt data container using key to generate encrypted data container storing key in platform repository
1212

Retrieve software container and version of encrypted data container when query is received from platform
1214

END

DATA SECURITY TRANSACTIONS USING SOFTWARE CONTAINER MACHINE READABLE CONFIGURATION DATA

FIELD

The present inventive subject matter relates generally to computer science, computer software, software development, cybersecurity, software containers, and software supply chain security and evaluation frameworks. More specifically, techniques for data security transactions using software container machine readable configuration data are described.

BACKGROUND

Software development and deployment has become a complex and complicated ecosystem of industry sectors, development entities, and suppliers. Used throughout numerous industrial, financial, scientific, commercial, academic, government, military, and other types of public and private applications, software is a critical infrastructural component of society and civilization having ever-increasing importance, but also accompanied by vulnerabilities and weaknesses that are sought to be exploited by bad actors, individual and sovereign-backed alike (e.g., criminals, hackers, state-backed cyberwarfare units, among some). Given the complexity of developing and deploying sophisticated software applications and platforms, the development and deployment of equally-sophisticated defensive techniques to protect software systems are another area of tremendous investment and activity. However, rather than developing sophisticated and expensive defensive software and techniques to protect against unwanted actors and activities, different software development techniques such as software containers are rising in popularity.

By using software containers, complex software systems can be entirely packaged and deployed using a "container," which contains an application and all of its dependencies to enable secure and rapid deployment. However, even these conventional software containers are often susceptible to cybersecurity breaches or, moreover, are untrustworthy and unsuitable for deployment in large scale deployment (e.g., enterprise applications or platforms). By attacking components of software containers prior to packaging or "containerizing," security tools and techniques can be exploited or corrupted without leaving a "trail" of corrupted configuration data.

Securing software supply chains is a critical activity to ensure noninterrupted operation of economies, businesses, organizations, and individual computing systems alike; so much so that the United States Government has issued directives to secure critical software supply chains. For example, U.S. President Joseph Biden issued an executive order entitled "Improving the Nation's Cybersecurity" on May 12, 2021 to specifically secure the software supply chain of all software systems used by the United States and its various contractors and agencies. Pursuant to such directives and executive orders, the development of numerous cybersecurity processes, apparati, systems, and technologies for securing software supply chains are critical to the development, implementation, and improvement of necessary software-based systems, regardless of whether government, public, private, commercial, financial, or other purposes. However, conventional efforts have been sporadic, chaotic, and problematic in terms of security containerized software applications, platforms, and environments.

Thus, there is a need for securing software containers from exploitation and vulnerabilities while also securing software supply chains of software containers, without the limitations of conventional solutions.

BRIEF DESCRIPTION OF THE DRAWINGS

Various embodiments or examples ("examples") are disclosed in the following detailed description and the accompanying drawings:

FIG. 5A illustrates an exemplary process for data security transactions using software container machine readable configuration data;

FIG. 6 illustrates an alternative exemplary process for data security transactions using software container machine readable configuration data;

FIG. 7 illustrates another alternative exemplary process for data security transactions using software container machine readable configuration data;

FIG. 8 illustrates an exemplary process for report generation in data security transactions using software container machine readable configuration data;

FIG. 9A illustrates an exemplary process of using file system rewrites to perform continuous integrity checks in software container data;

FIG. 12 illustrates an exemplary process for generating and managing writeable data containers.

DETAILED DESCRIPTION

Figure 1A:
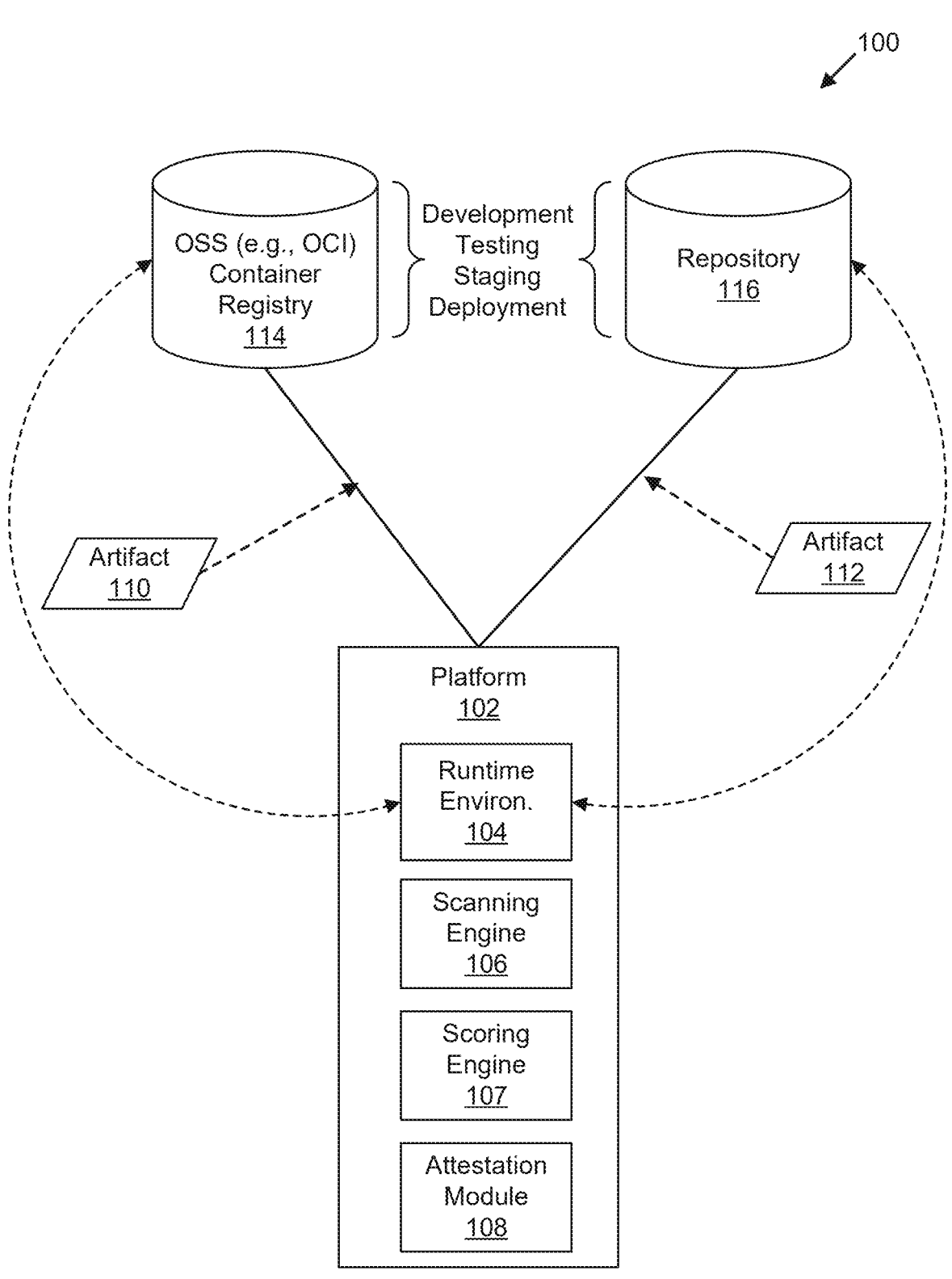
FIG. 1A illustrates an exemplary system for data security transactions using software container machine readable configuration data.

Various embodiments or examples may be implemented in numerous ways, including as a system, a process, an apparatus, a user interface, or a series of program code or instructions on a computer readable medium such as a storage medium or a computer network including program instructions that are sent over optical, electronic, electrical, chemical, wired, or wireless communication links. In general, individual operations or sub-operations of disclosed processes may be performed in an arbitrary order, unless otherwise provided in the claims.

A detailed description of one or more examples is provided below along with accompanying figures. This detailed description is provided in connection with various examples, but is not limited to any particular example. The scope is limited only by the claims and numerous alternatives, modifications, and equivalents. Numerous specific details are set forth in the following description in order to provide a thorough understanding. These details are provided for the purpose of illustrating various examples and the described techniques may be practiced according to the claims without some or all of these specific details. For clarity, technical material that is known in the technical fields and related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture using various computing resources that are configured to provide computing features, functions, processes, elements, components, or parts, without any particular limitation as to the type, make, manufacturer, developer, provider, configuration, programming or formatting language (e.g., Python™, R, JAVA®, JAVASCRIPT®, XML, HTML, and others, without limitation or restriction), service, class, resource, specification, protocol, or other computing or network attributes. As used herein, "software" or "application" may also be used interchangeably or synonymously with, or refer to a computer program, software, program, firmware, or any other term that may be used to describe, reference, or refer to a logical set of instructions that, when executed, performs a function or set of functions within a computing system or machine, regardless of whether physical, logical, or virtual and without restriction or limitation to any particular implementation, design, configuration, instance, or state. Further, "platform" may refer to any type of computer hardware (hereafter "hardware") and/or software using, hosted on, served from, or otherwise implemented on one or more local, remote, and/or distributed data networks such as the Internet, one or more computing clouds (hereafter "cloud"), or others. Data networks (including computing clouds) may be implemented using various types of standalone, aggregated, or logically-grouped computing resources (e.g., computers, clients, servers, tablets, notebooks, smart phones, cell phones, mobile computing platforms or tablets, and the like) to provide a hosted environment for an application, software platform, operating system, software-as-a-service (i.e., "SaaS"), platform-as-a-service, hosted, or other computing/programming/formatting environments, such as those described herein, without restriction or limitation to any particular implementation, design, configuration, instance, version, build, or state. Distributed resources such as cloud computing networks (also referred to interchangeably as "computing clouds," "storage clouds," "cloud networks," or, simply, "clouds," without restriction or limitation to any particular implementation, design, configuration, instance, version, build, or state) may be used for processing and/or storage of varying quantities, types, structures, and formats of data, without restriction or limitation to any particular implementation, design, or configuration. In the drawings provided herewith, the relative sizes and shapes do not convey any limitations, restrictions, requirements, or dimensional constraints unless otherwise specified in the description and are provided for purposes of illustration only to display processes, data, data flow chart, application or program architecture or other symbols, as described in this specification.

As described herein, structured and unstructured data may be stored in various types of data structures including, but not limited to databases, repositories, warehouses, datalakes, lakehouses, data stores, and other data structures and facilities configured to manage, store, retrieve, process calls for/to, copy, modify, or delete data or sets of data (i.e., "datasets") in various computer programming languages and formats (e.g., structured, unstructured, binary, and others) in accordance with various types of structured and unstructured database schemas and languages such as SQL®, MySQL®, NoSQL™, DynamoDB™, R, or others, such as those developed by proprietary and open source providers like Amazon® Web Services, Inc. of Seattle, Washington, Microsoft®, Oracle®, Google®, Salesforce.com, Inc., and others, without limitation or restriction to any particular schema, instance, or implementation. Further, references to databases, data structures, or any type of data storage facility may include any embodiment as a local, remote, distributed, networked, cloud-based, or combined implementation thereof, without limitation or restriction. In some examples, data may be formatted and transmitted (i.e., transferred over one or more data communication protocols) between computing resources using various types of wired and wireless data communication and transfer protocols such as Hypertext Transfer Protocol (HTTP), Transmission Control Protocol (TCP)/Internet Protocol (IP), Internet Relay Chat (IRC), SMS, text messaging, instant messaging (IM), WiFi, WiMax, or others, without limitation. Further, as described herein, disclosed processes implemented as software may be programmed using JAVA®, JAVASCRIPT®, Python, R, Scala, Perl, XML, HTML, or other data formats and programming languages, without limitation. As used herein, references to layers of an application architecture (e.g., application layer or data layer) may refer to a stacked layer application architecture designed and configured using models such as the Open Systems Interconnect (OSI) model or others.

The described techniques may be implemented as a software-based application, platform, or system. In some examples, machine learning, deep learning, neural network, and other types of computing, processing, and analytical algorithms such as those used in various computer science-related fields may be used to implement techniques related to "artificial intelligence" (i.e., "AI"), general predictive artificial intelligence, general predictive transformers, or generative artificial intelligence (e.g., such as those developed by OpenAI™, Microsoft®, Google® (e.g., Bard), Stability AI (e.g., Stability Diffusion), MidJourney, and others, without limitation or restriction) including, but not limited to, any type of large language model or transformer. While there is no particular dependency to a given type of model (e.g., large language model) or algorithm (e.g., machine learning, deep learning, neural networks, intelligent agents, or any other type of algorithm that, through the use of computing machines, attempts to simulate or mimic certain attributes of natural intelligence such as cognitive problem solving, without limitation or restriction), there is likewise no requirement that only a single instance or type of a given algorithm or dataset be used in the implementations described. Algorithms may be untrained or trained using model data, external data, internal data, or other public or private sources of data that may be used to improve the accuracy of calculations performed or trained to generate output data for use in applications, systems, or platforms in data communication with software module or engine-based implementations. The described techniques within this Detailed Description are not limited in implementation, design, function, operation, structure, configuration, specification, or other aspects and may be varied without limitation. The size, shape, quantity, configuration, function, or structure of the elements shown in the various drawings may be varied and are not limited to any specific implementations shown, which are provided for exemplary purposes of illustration and are not intended to be limiting.

FIG. 1A illustrates an exemplary system for data security transactions using software container machine readable configuration data. Here, topology 100 includes software container security platform (hereafter "platform") 102, runtime environment 104, scanning engine 106, scoring engine 107, attestation module 108, artifacts 110-112, open source software (hereafter "OSS") registry 114 (hereafter "registry 114"), and repository 116 (hereafter "repository 116"). In some examples, system 100 and elements 102-116 may be designed, configured, and implemented to query, retrieve, parse, process, and perform other data operations to identify and evaluate the software supply chain (not shown) of software containers (also not shown) that may be stored or retrieved from either an open source registry (e.g., registry 114) or another type of data storage facility, such as repository 116. In some examples, an OCI registry (e.g., registry 114) may be implemented as an open source data storage facility or service that is configured to store, as an example, OCI artifacts (e.g., Docker Hub Container Image Library or other types of data container images or libraries, as well as other types of open source data or data used with open source registries such as an OCI registry) using any type of open source software frameworks or schemas for software container design, configuration, and execution. As an example, Open Container Initiative (OCI) may be used as a framework for architecting a software container stored in repository 116. As used throughout, repository 116 may be implemented as a data repository for storing, retrieving, writing, reading, or performing any type of operation related to any type of container, proprietary or otherwise, without limitation or restriction. For example, repository 116 may be a source code repository such as those found and used on GitHub™, GitLab™, or others, without limitation or restriction. In some examples, an exemplary data flow using topology 100 may include storing source code associated with a software container and its applications, dependencies, or other elements therein in a source code control repository (e.g., repository 116) and then use a continuous integration and continuous delivery or development workflow (hereafter "CI/CD workflow" that is a software development process(s) to continuously build, test, deploy, and monitor/manage iterative source code changes) to build an artifact (e.g., OCI artifact) to be stored in registry 114 or software container(s) stored in repository 116.

In other examples, software containers designed, developed, configured, executed/run, or otherwise implemented may also be stored as a proprietary container in repository 116. In repository 116, software containers may also be stored, indexed, or otherwise accessed by processes used to create or manage data artifacts stored in registry 114. As used throughout, a software container may refer to any type of data encapsulation or "container" that includes an application and associated dependencies necessary to store, retrieve, implement, execute, run, compile, process, use, or perform other operations without requiring other software to be implemented with a given software container. A software container allows a fully-encapsulated application, platform, operating system (hereafter "OS"), or other program to be retrieved, compiled, and run without requiring callouts to other applications, systems, libraries, or software in order to execute at run-time.

Referring back to FIG. 1A, software containers stored in repository 116 may be retrieved by platform 102 and imported into run-time environment 104 (as indicated by the broken-dashed line). Once implemented in a run-time environment, a software container (or a copy or cached version thereof) may be evaluated by parsing source code associated with the software container. In some examples, scanning engine 106 may be used to scan source code associated with open source software (hereafter "OSS") containers from registry 114 or proprietary software containers from repository 116. Regardless of which type of programming schema (e.g., OSS or proprietary), platform 102, using scanning engine 106, may be configured to parse source code of software containers to identify a security tool(s) used by, with, within, or referenced for which representative data may be generated as input to one or more scoring engines such as scoring engine 107. Alternatively, platform 102, using scanning engine 106, may also be configured to parse source code of a software container and its components to identify a security threat or vulnerability (hereafter "threat" may refer inclusively to threats and vulnerabilities) or "known compromise" to a software container, a component thereof, or a supply chain for the software container or its component(s). When parsing responsive data, source code may be identifier and further processed by platform 102 to generate unique identifiers (not shown) that may be compared to lists, records, tables, or other data structures containing identifiers of known compromises (i.e., known compromise indicators) stored in repository(s) (not shown) that may be referenced (i.e., reference calls or look up data operations may be performed by platform 102), regardless of whether the repository(s) are topologically local, remote, networked, wired, wireless, virtual, physical, or implemented otherwise differently (i.e., not in direct data communication with platform 102), without limitation or restriction.

In some examples, using scoring engine 107, platform 102 may be configured to "score" individual components (e.g., security tools, or any type of class, library, or process) included in a given software container. Scoring engine 107 may also be implemented using different types of scoring engines, including those that are component-based while others may be framework-based, such as those developed to apply frameworks such as SLSA™ (i.e., Supply-chain Levels for Software Artifacts) as developed by the Linux Foundation and Google, Inc. of Mountain View, California or others. Scoring engine 107 may be configured to generate a quantitative score associated with a software container and/or its individual components. As an example, a software container may have a generated score associated with a given security tool or set of security tools that are included within the container, including any dependencies. A software container may also have an overall generated score assigned that is a composite, amalgamation, average, collective, or otherwise constructed summation of scores generated for each component of a given software container. Various types of algorithms may be used by scoring engine 107 and platform 102 to develop scores for a software container and its individual components (e.g., security tools).

In some examples, platform 102 may also be configured to evaluate retrieved data artifacts (e.g., artifacts 110-112, which may include any type of data, including source code) for a given OSS container (i.e., from registry 114) or software container source code from repository 116 to identify a software supply chain for each component (i.e., "element") included in a given software container. By identifying the complete software supply chain for a given software container and its components as well as associating individual scores to each container and its components, a unique score can be generated and used to signify a quantitative risk level, assessment, or risk factor associated, one, some, or all of which may be used to further generate an attestation from attestation module 108 from platform 102. In some examples, an attestation or assessment generated by attestation module 108 may be an algorithmically-determined assessment of the software supply chain of a given software container and each component and associated dependencies container within. An attestation, as an example, may be automatically-generated by platform 102 and used to certify to a client, user, or other end-consumer of output data from platform 102 to determine whether a given software container is "trustworthy" or whether it or its components may have been compromised (e.g., hacked, altered, modified, or the like) and security is jeopardized, thus prevent the implementation, loading, or execution of compromised software that could lead to catastrophic results or loss.

As shown here, software containers stored in repository 116 may be stored as or otherwise retrieved as artifacts 110-112, respectively, which may constitute data of various types, forms, formats, or sizes that are representative of a software container and/or individual components thereof, including source code. In other words, copies of data representing software containers stored in repository 116 may be retrieved as artifacts 110-112 while leaving the original software containers in memory. Once written out as copies or artifacts 110-112, platform 102 may perform data operations and data transformations in order to identify a software supply chain for each software container and each component thereof. As shown and indicated, registry 114 and/or repository 116 may be queried by platform 102 to retrieve software containers or artifacts thereof at any stage in the lifecycle of a software container such as development, testing, staging, deployment, and others, without limitation or restriction. As shown and described, platform 102 may be configured to evaluate the security of software containers and components thereof using the techniques described herein, regardless of whether open source or proprietary software architectures and schemas are used.

Here, artifacts 110-112 may be queried and retrieved as responsive data from either registry 114 or repository 116 by platform 102 during a continuous integration/continuous. Once retrieved, platform 102 may be configured to parse source code to identify machine-readable program or source code (i.e., "source code") to identify one or more configuration files or configuration data (hereafter "configuration" or "config" data). Once parsed and identified, source code associated with configuration data for a given software container may be evaluated by referencing the evaluate source code with one or more libraries (which may be internal, remote, or otherwise called by platform 102 over, for example, a data network (e.g., Internet, LAN, cloud, virtual, or the like, without exception or limitation (not shown)) to determine whether a change (e.g., modification, addition, deletion, or others, without limitation or restriction) between the referenced source code or the actual source code of a given software container indicates a change was committed at some stage (e.g., design, development, testing, stage, deployment, or others, without limitation or restriction), which would indicate a change was made and, upon further machine or algorithmic evaluation of the changed source code by scoring engine 107, assigning a code reflective of the nature of the change (e.g., a low score may indicate a high degree of likelihood the software container has been altered, modified, tampered with, hacked, corrupted, or otherwise rendered insecure). Configuration data, read by a non-humanistic, machine-readable capable scoring engine configured to parse and evaluate binary files, characters, or data (e.g., scoring engine 107), then provides platform 102 with a score for each component of a given software container (depending upon how many components are indicated in the parsed config data from artifacts 110-112), all of which may then be aggregated by an aggregate scoring engine (not shown) to generate an overall score and risk assessment, as described in greater detail below. In other examples, system 100 and the elements shown and described may be varied in structure, function, design, layout, order, quantity, size, shape, configuration, topology, architecture, schema, and implementation and are not limited to solely those examples shown and described, which are provided for purposes of exemplary description.

Figure 1B:
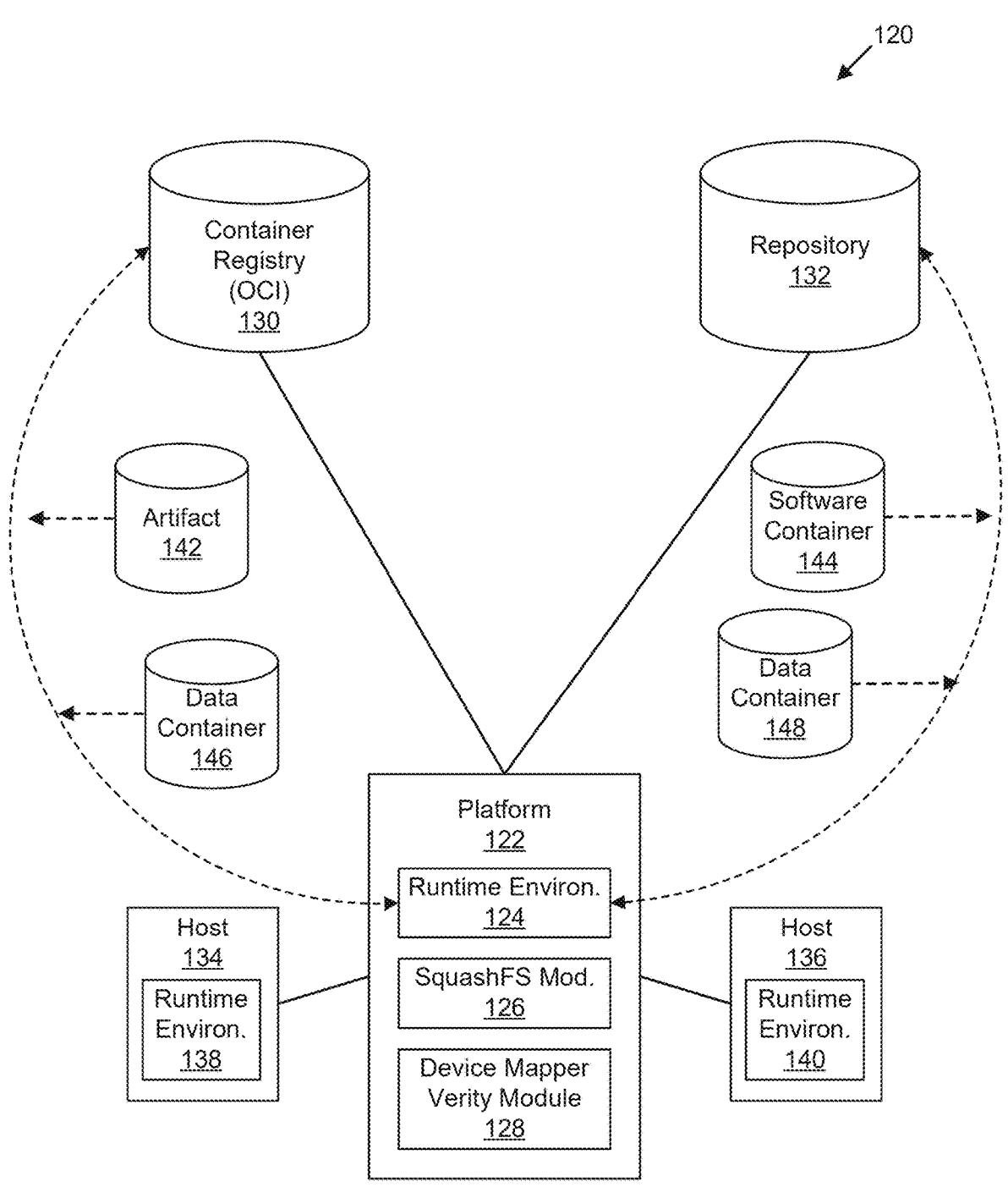
FIG. 1B illustrates an exemplary alternative system for data security transactions using software container machine readable configuration data.

FIG. 1B illustrates an exemplary alternative system for data security transactions using software container machine readable configuration data. Here, system 120 includes platform 122 (which may be designed, developed, implemented, and/or executed similarly to platform 102 of FIG. 1A), runtime environment (hereafter "environment") 124, SquashFS File Format module (hereafter SquashFS module) 126, Device Mapper Verity module (used interchangeably hereafter with "dm-verity module") 128, container registries 130, container repository 132, hosts 134-136, runtime environments 138-140, artifact 142, software container 144, and data containers 146-148. As used herein, artifact 142 and software container 144 may refer to software containers, data artifacts thereof (herein referred to as "artifacts" generally) software container data, software container images, software container image data, or the like. Likewise, data containers 146-148 may refer to data containers, container data, data container images, container image data, or the like. In some examples, runtime environments 124 and 138-140 may be application execution environments in which artifact 142 and software container 144 are retrieved from one or more of container registries 130 and/or 132, unpacked, loaded, and run (i.e., executed) and, during runtime, platform 102 may be configured to sample, query, retrieve, or otherwise transfer data between runtime environments on hosts 134 and/or 136 while software containers are being executed on hosts 134-136, or others (not shown).

Here, artifact 142 and software container 144 may be configured to use SquashFS (as developed by The Linux Foundation) or another similar file format that permits platform 122 to determine before, during, and after execution of software container 144 and its dependencies whether any components, elements, or content thereof (e.g., application, dependencies, or other software container components) have been modified or altered. In some examples, artifact 142, which may be formatted using an open source or Open Container Initiative (OCI) software container format, may be requested (i.e., queried) by platform 122 and retrieved from container registry (e.g., OCI registry) 130.

Once received by platform 122, the file format of artifact 142 and/or software container 144 may be rewritten into a SquashFS read-only file format using SquashFS module 126. As a read-only file format, software container 142 may then be rendered into an immutable OCI standards-compliant (i.e., configured to be stored in any OCI standards-compliant container registry) format that may be read before, during, or after runtime execution on platform 102 (i.e., in runtime environment 124) or host 134 (i.e., using runtime environment 138). Before, during, and after execution (i.e., runtime), verification of containerized formats and format integrity may be performed at a kernel-level (i.e., more specifically, at a Linux kernel level) using device mapper verity (i.e., dm-verity) module 128. In some examples, if changes, modifications, or alterations are found by dm-verity module 128, then platform 122 may be configured to stop or interrupt execution. In other words, if platform 122 and dm-verity module 128 identifies any change, however slight, or modification to artifact 142 or software container 144, then runtime execution may be halted, a reload and restart of execution of software container 144 may be performed, an alert sent to hosts 134-136, or other corrective actions may be taken by platform 122 to prevent file system corruption, application errors, hacks, exploits, or the like.

In other examples, runtime environment 138 may be configured to execute encrypted software containers without requiring decryption to a file system format (e.g., runtime environment 138) and avoid "exploding" the layers of software container 144 in a manner that exposes decrypted and unprotected components (i.e., layers) to compromises, known or unknown. In other words, artifact 142 and software container 144 may be retrieved (or copies thereof) to platform 122 and rewritten to a file format (e.g., SquashFS) that may then be read and analyzed by device mapper verity (dm-verity) module 128 to decrypt components and layers of software containers 144 during runtime execution on platform 122 and/or hosts 134-136, or other hosts, clients, platforms, or systems (not shown). In other words, software container 144, in an OCI format, may be in a host file system (e.g., SquashFS) that does not require decryption prior to runtime execution, but instead can utilize a Linux kernel integrity verification feature such as dm-verity module 128 to instead verify the integrity of a software container before, during, or after runtime execution. In so doing, dm-verity module 128 can utilize a modification to an open source "containerd" runtime environment (e.g., runtime environment 124) to read encrypted layers of a software container (e.g., software container 144), configure a Linux kernel to execute software container 144, decrypt software container 144 and its components "on the fly" (i.e., before, during, or after runtime execution), and run software container 144 in runtime environment 124, 134, or 136 (i.e., on platform 122 or hosts 134 or 136).

In other examples, software containers, regardless of container format (e.g., OCI, proprietary, or others, without limitation or restriction) may be stored in repository 132 along with other data such as input and output generated by a given software container, version information, semantic information, and the like. To improve and increase portability and usability, software container image data may be separated from input and output data, the former being artifact 142 and/or software container 144 and the latter being data containers 146-148. As shown in system 120, platform 122 may be configured to bind data containers 146 and 148 to artifact 142 and/or software container 144, respectively, during runtime execution, which may be run on platform 122 (i.e., runtime environment 124) or on a host such as host 134 (i.e., runtime environment 138) or host 136 (e.g., runtime environment 140). When run, software container 144 may be bound or coupled to input and output data, version information, semantic information, or other data or information during runtime execution, thus enabling software containers to be more portable and less restricted in usability. In other words, by decoupling artifact 142 and/or software container 144 from data containers 146 and 148, respectively, at runtime other types and varieties of information may be later bound and used. As described herein, data containers may be read only, read write, or other types of data handling protocols, without limitation or restriction. Further, in some examples, input and output data generated by artifact 142 and/or software container 144 may also be persisted beyond runtime execution and stored in container registry 130 and/or repository 132 or other registries or repositories (not shown), which may be virtual, physical, local, remote, distributed, networked, or otherwise, without limitation or restriction.

For example, container registry (OCI) 130 may be configured to store software containers formatted according to OCI (e.g., software container 142) and data associated with input and/or outputs generated by a given software container (e.g., data container 146) in container registry (OCI) 130 or repository 132. By doing so, storage, tagging (i.e., with metadata or other types of metadata, semantic data, or the like), and managing software containers (e.g., artifact 142, software container 144) and data (e.g., data container 146) may be performed by using container registry (OCI) 130, thus utilizing the same or similar storage volume, as managed by platform 122, manageability, portability, flexibility, and security are improved.

In other examples, container registry (OCI) 130 and repository 132 may be configured to support various container runtimes for open source (e.g., software container 144) or other types of software containers such as those stored in repository 132. For immutable artifacts (e.g., artifact 110 (FIG. 1A)), a copy-on-write protocol may be employed. In some examples, when a write command of software container 142 is detected, a copy of software container 144 is made and stored in a storage volume (e.g., repository 132, container registry 130 (FIG. 1B), and others). The copy made may be generated and stored as a new data container (e.g., data containers 146-148) in container registry 130 and/or repository 132 when a given software container is modified. Thus, platform 302 may perform write operations to artifact 142 or software container 144 by writing to a given state of a software container, which may be reflected by different copies of software containers 142-144 stored in container registry 130 and/or repository 132, respectively.

In still other examples of data security transactions and handling that may be performed by platform 302, sensitive data (e.g., data artifacts, source code of software containers and components thereof) that is desired to be protected from compromise may be streamed from a runtime environment (e.g., runtime environments 124, 138-140) to a remote secure storage volume (e.g., container registry 130, repository 132, registry 114, repository 116 (FIG. 1A), or others (not shown)). Alternatively, when software container 144 is executed (i.e., run) in runtime environments 124, 138, and/or 140, data container 146-148 may be configured as a writable data container that is configured to store, house, or otherwise act as a storage volume for input and/or output data generated as artifact 142 and/or software container 144. In some examples, a writeable data container may be configured with additional security such as private and public key encryption or other encryption techniques to prevent access to sensitive information stored. Data that may be valuable, secure, or of a highly sensitive nature may be stored in a secure manner apart from artifact 142 and software container 144. Further, by separately storing, handling, and managing data stored in writeable data containers, which may be implemented as data containers 146-148, compromises of software container 144 may be prevented from unwanted access of data or information stored in data containers 146-148. In other examples, system 120 and the elements shown and described may be varied in structure, function, design, layout, order, quantity, size, shape, configuration, topology, architecture, schema, and implementation and are not limited to solely those examples shown and described, which are provided for purposes of exemplary description.

Figure 2:
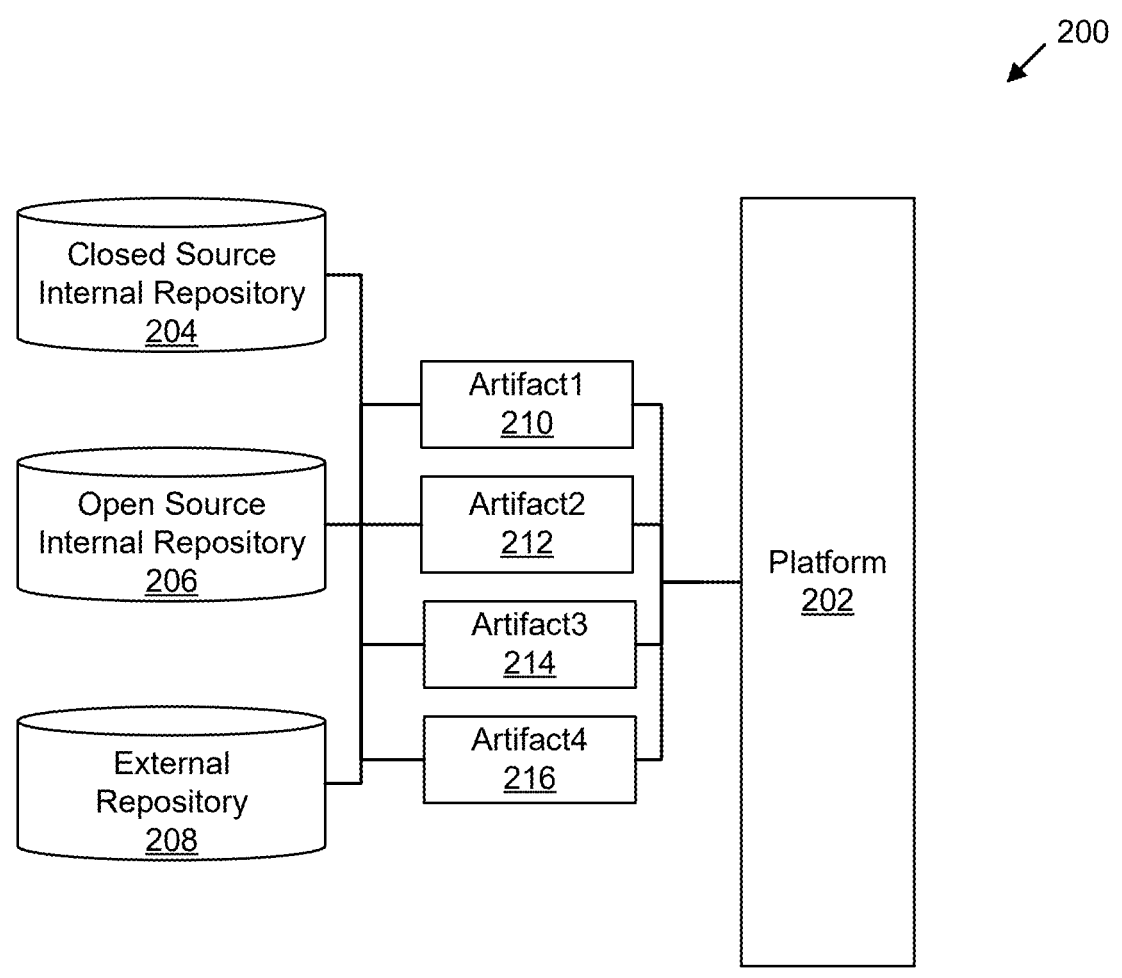
FIG. 2 illustrates an exemplary data architecture for data security transactions using software container machine readable configuration data.

FIG. 2 illustrates an exemplary data architecture for data security transactions using software container machine readable configuration data. Here, data architecture 200 includes platform 202, closed source (i.e., proprietary) internal repository 204, open source internal repository 206, internal repository 208, and artifacts 210-216. In some examples, repositories 204-208 are exemplary illustrations of types of repositories that may be used to store, retrieve, copy, write, read, or perform other data operations, transactions, or transformations on software containers and components thereof, such as transferring data representative of artifacts of software containers between repositories 204-208 and platform 202. As shown, platform 202 may be configured to transmit a query (i.e., a query may be generated automatically, semi-automatically, or manually from a client terminal or computing edge device in data communication with platform 102 or by one or more components of platform 102, including machine or algorithmically-implemented logic modules of platform 102) to one or more of repositories 204-208 to retrieve one or more, for example, of artifacts 210-216. Once received, artifacts 210-216 may be processed by platform 202, as described throughout this Detailed Description. In other examples, data architecture 200 and elements 202-216, as shown and described, may be varied in structure, function, design, layout, order, quantity, size, shape, configuration, topology, architecture, schema, and implementation and are not limited to solely those examples shown and described, which are provided for purposes of exemplary description.

Figure 3A:
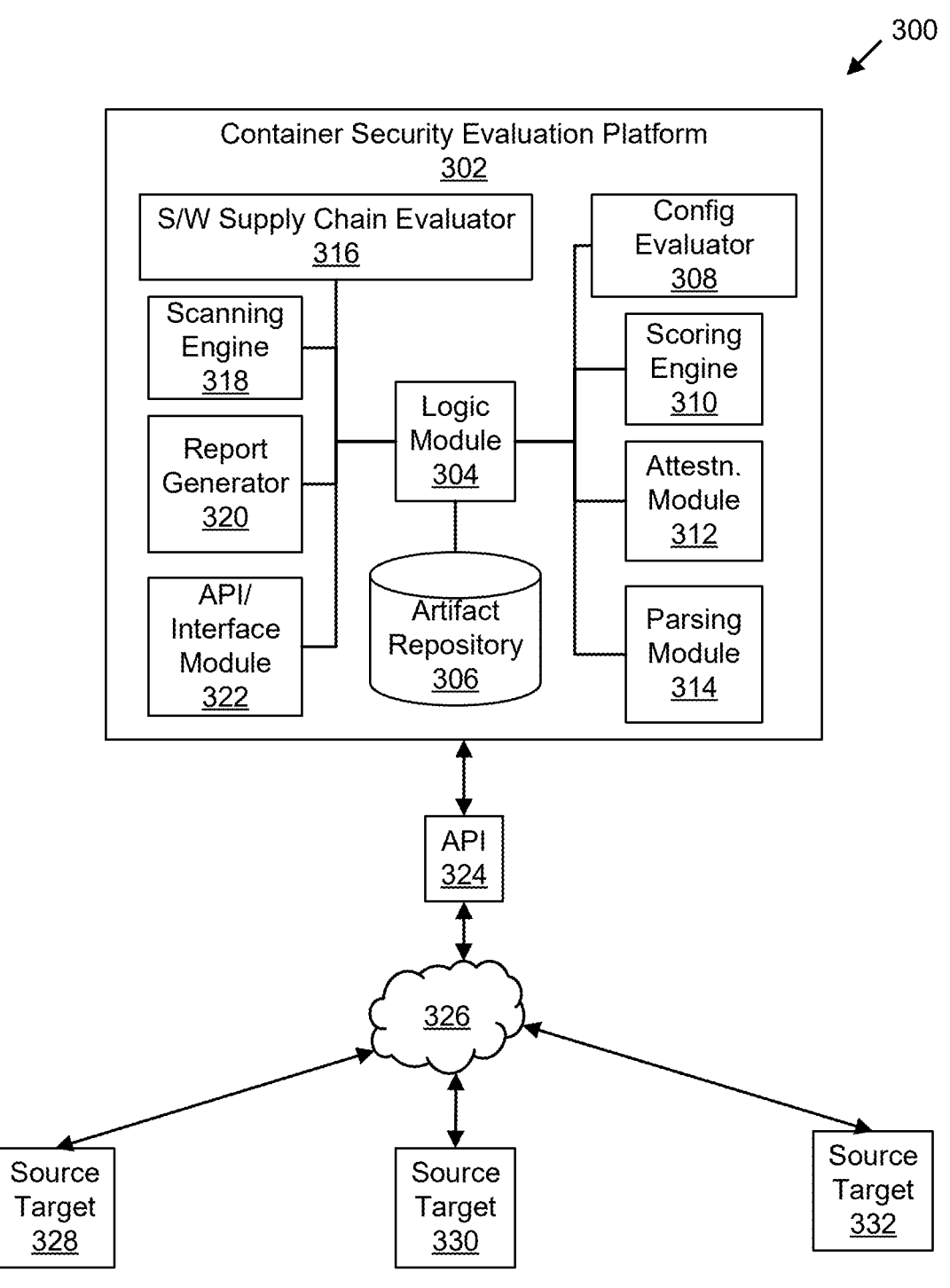
FIG. 3A illustrates an exemplary application architecture for data security transactions using software container machine readable configuration data.

FIG. 3A illustrates an exemplary application architecture for data security transactions using software container machine readable configuration data. Here, application architecture 300 illustrates container security evaluation platform (hereafter "platform") 302, logic module 304, artifact repository 306, configuration data evaluator 308, scoring engine 310, attestation module 312, parsing module 314, software supply chain evaluator 316, scanning engine 318, report generator 320, API/Interface Module 322, Api 324, network 326, and source targets 328-332. As used herein, application architecture 300 and elements 302-332 having similar names or reference numerals to others shown or described in connection with other Figures throughout this Detailed Description may be interpreted as having similar structure or function.

In some examples, platform 302 may be implemented using various functional elements such as those shown including logic module 304, which may be used to coordinate, direct, instruct, initiate, terminate, or otherwise transfer data or perform processes that control or direct other functions described in connection with other elements of platform 302. Logic module 304 may be implemented as software, hardware, circuitry, or a combination thereof and may utilize rules, parameters, thresholds, algorithms, or artificial intelligence, such as those described above, utilizing large language models that are trained, untrained, supervised, unsupervised, or others, without limitation or restriction. Generating queries, logic module 304 may initiate queries over API (i.e., Application Programming Interface) 324 to one or more of source targets 328-332. In some examples, source targets 328-332 may be implemented as data repositories such as those described above in connection with those operating on, storing, housing, or otherwise acting as data storage repositories or facilities for open source, proprietary, or other types of software containers. As shown, one or more of source targets 328-332, upon receipt of a query initiated by platform 302 (i.e., logic module 304), may be transferred over network 326 (e.g., the Internet, Dark Web, or any type of public or private data network, without limitation or restriction) using API/interface module to format and process data for transmission to one or more of source targets 328-332 using API 324. Various types of processes may be performed by API 324 (e.g., security handshakes, coding, decoding, or the like, without limitation or restriction) prior to end transmission to platform 302.

Once received by platform 302, for example, responsive data such as artifacts returned in response to a query from platform 302 may be further processed by initial storage in artifact repository 306. Once stored, artifacts may be parsed by parsing module 314 and scanning engine 318 may be configured to scan parsed source code to identify configuration data (e.g., configuration data files, configuration files, or config files or data) using config evaluator 308. After parsing and evaluating source data associated with artifacts received into platform 302, config evaluator 308 identifies configuration data for security tools found in a given software container (e.g., artifact from one or more of sources 328-332), which may be associated with individual components found within a given software container. Once identified, configuration data (not shown) may be used to generate a reference call by software supply chain evaluator 316 using API/interface module 322 over API 324 and network 326 to a library (e.g., which may also be one or more of source targets 328-332) to compare identified configuration data (i.e., "config data") with a reference copy of configuration data for the identified security tool/component to determine whether a change was made to the source code of the artifact being evaluated by platform 302.

Using scoring engine 310, a score is generated using one or more algorithms based on the comparison between the parsed and identified configuration data (not shown) and configuration data for the same component from a reference library (not shown). Depending upon the nature of an identified change to source code, the extent to which the change was committed to the source code, the nature of the component or software container associated with the source code, scoring engine 310 may be configured to generate various types of scores associated with a given software container and its individual components and dependencies. In some examples, scoring engine 310 may be configured to generate, as described above and herein, individual software container component scores and aggregate software container scores. As an example, platform 302 may be configured to generate scores for each individual component of a software container (not shown) and, using the individual scores, generate an aggregate score for the overall software container. As used herein, a "component" may be any individual computing element, process, or dependency of a software container, including security tools that are used to secure a software container through its lifecycle, including development, testing, staging, and deployment. In other words, a software container using a particular type of security tool may be scored by scoring engine 310 and assigned an aggregate score based on individual component scores generated or identified by software supply chain evaluator 316 and platform 302.

Using an aggregate score for a software container and scores for individual components of the container, report generator 320 may be configured to generate a report for output (using API/interface module 322). Various scores, information, and data may be presented in a report output from report generator 320 via API/interface module 322 and API 324 to, for example, a client terminal or display (not shown). In other examples, reports generated by report generator 320 may be generated with any form, format, or content including, in some examples, a security report or risk attestation as to the security integrity (or lack thereof) of a given software container. In some examples, attestation module 312 may be configured to generate an attestation tag, metadata, or data to be associated with a software container under evaluation by platform 302, which may be transmitted to a requesting client terminal in data communication with platform 302. An attestation may be a digitally encoded, formatted, or other data representing a certification included in a report generated by report generator 320 that attests to the security of the supply chain associated with a given software container, the software container, the individual components within a given software container, and all dependencies associated therewith. In yet other examples, a separate certificate or certification may also be generated by platform 302, report generator 320 and/or attestation module 312, each of which may be configured to output data that may be formatted for rendering or display on a client or user terminal or display (not shown), including data and information as to the security state (as represented by an aggregate score of a software container and individual component scores of a component(s) thereof).

In other examples, an attestation generated by platform 302 and attestation module 312 may be implemented differently and is not limited to the examples, shown and described. Further, platform 302 and the elements shown and described may be implemented differently and are not limited to those shown and described.

Figure 3B:
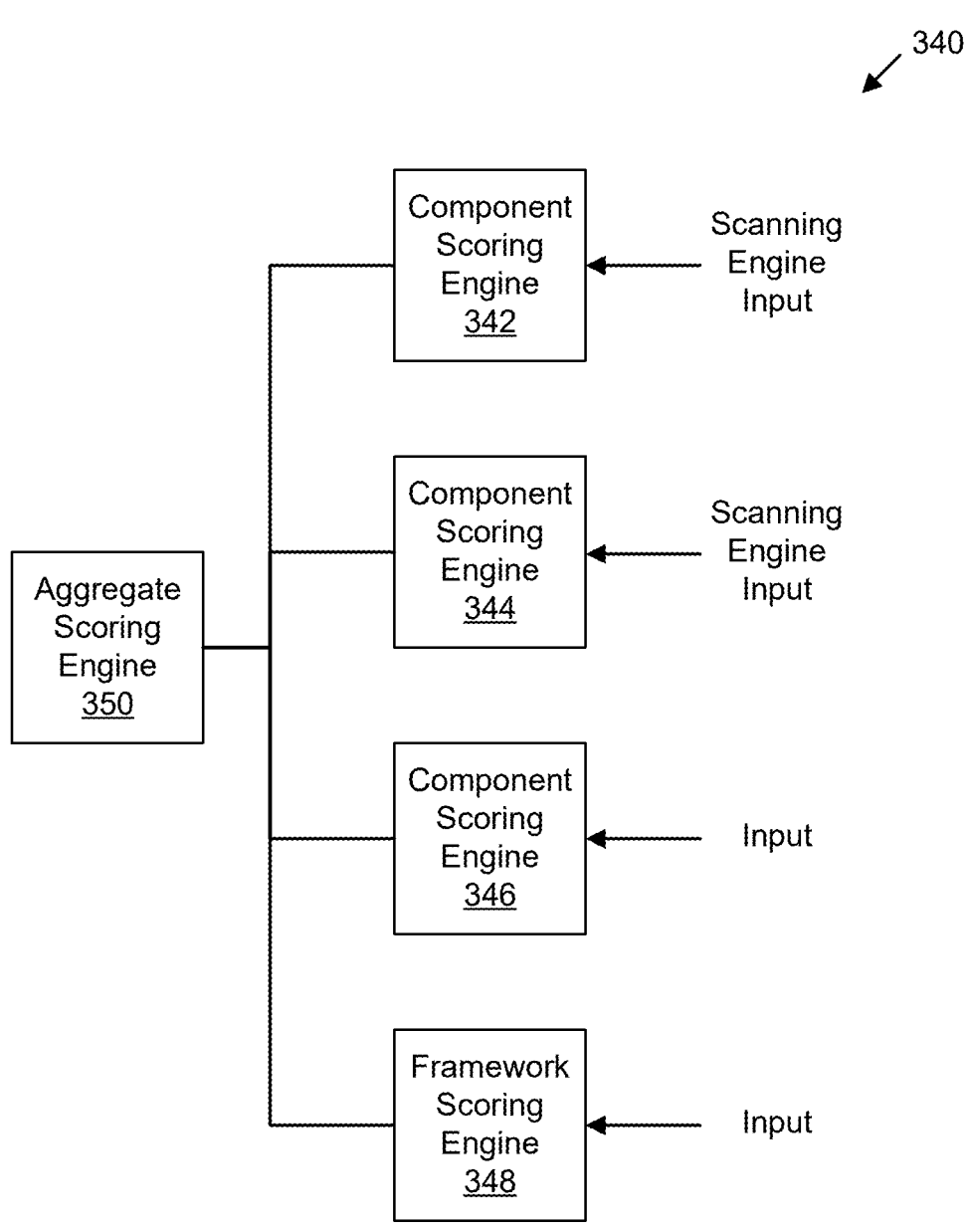
FIG. 3B illustrates an exemplary scoring engine topology for data security transactions using software container machine readable configuration data.

FIG. 3B illustrates an exemplary scoring engine topology for data security transactions using software container machine readable configuration data. Here, topology 340 may be implemented using multiple and different types of scoring engines such as component scoring engines 342-346, framework scoring engine 348, and aggregate scoring engine 350. In some examples, scoring engine 310 (FIG. 3A) may be implemented using, for example, topology 340 and one or more of component scoring engines 342-346, framework scoring engine 348, and aggregate scoring engine 350. The number, type, configuration, and implementation of scoring engines may be varied and is not limited to topology 340, which is provided as an exemplary of how scoring engine 310 (FIG. 3A) may be designed, implemented, and function.

Referring back to FIG. 3B, when a software container undergoes evaluation by platform 302 (FIG. 3A) by processing configuration data parsed from source code associated with a software container, not only is the software supply chain associated with the software container identified, but also identified are individual components of a given software container. For example, individual components of a software container may include dependencies, executables, configuration files, environment variables, binary code (i.e., "binaries"), libraries, and artifacts, all, some, or none may be evaluated by platform 302 (FIG. 3A). Referring to FIG. 3B, identified components may be evaluated individually by one or more component scoring engines 324-346. As an example, component scoring engines 342-344 may be configured to receive input from a scanning engine (e.g., scanning engine 318 (FIG. 3A)), which may be configuration data parsed from a software container. Component scoring engines 342-344 may generate scores for the input configuration data by referencing other configuration data in libraries that, upon conclusion of scoring, comparison, and evaluation processes performed by scoring engines 342-344, generate scores associated with each scored component and the scores are determinative of a security risk, attribute, or other characteristic that may be used to indicate the security and integrity of the supply chain associated with the component and/or the individual component itself.

In other examples, different types of scoring engines may be used, which may be used for software containers or individual components therein. In still other examples, scoring engines may also be used to apply security frameworks such as SLSA, as described above, or others, without limitation or restriction. Using framework scoring engine 348, for example, input from scanning engine 318 (FIG. 3A) of an artifact retrieved (i.e., received as responsive data in response to a query from platform 302 (FIG. 3A)), may be configured to score a software container or a component thereof on a scale from 1 to 4, to indicate the security reliability and integrity of an associated supply chain. In other examples, different scales or ranges of scores may be applied and are not limited to those of a given framework.

Regardless, scoring engines 342-348 may be varied in type, configuration, quantity, functionality, or other aspects, without limitation or restriction. Further, inputs to scoring engines 342-348 may also be varied and are not limited to input from, for example, scanning engine 318 (FIG. 3A) or other specific modules. In other words, different sources of input beyond those shown and described may be used to provide input to one or more of scanning engines 342-348. As described herein, scoring engines 342-348 may be designed and configured to apply one or more algorithms or computing processes such as artificial intelligence, including using generative predictive transformers and large language models to produce scores assigned to individual components and software containers. For a given software container, once component and/or framework scoring engines 342-348 have generated scores for all components, as an example, aggregate scoring engine 350 may be used to generate an aggregate or overall score for the container.

In some examples, once all components of a given software container (not shown) are scored by scoring engines 342-348, an aggregate score may be generated and assigned to a given software container based on the scores of its individual components. In other examples, topology 340 and elements 342-350, as shown and described, may be varied in structure, function, design, layout, order, quantity, size, shape, configuration, topology, architecture, schema, and implementation and are not limited to solely those examples shown and described, which are provided for purposes of exemplary description.

Figure 4:
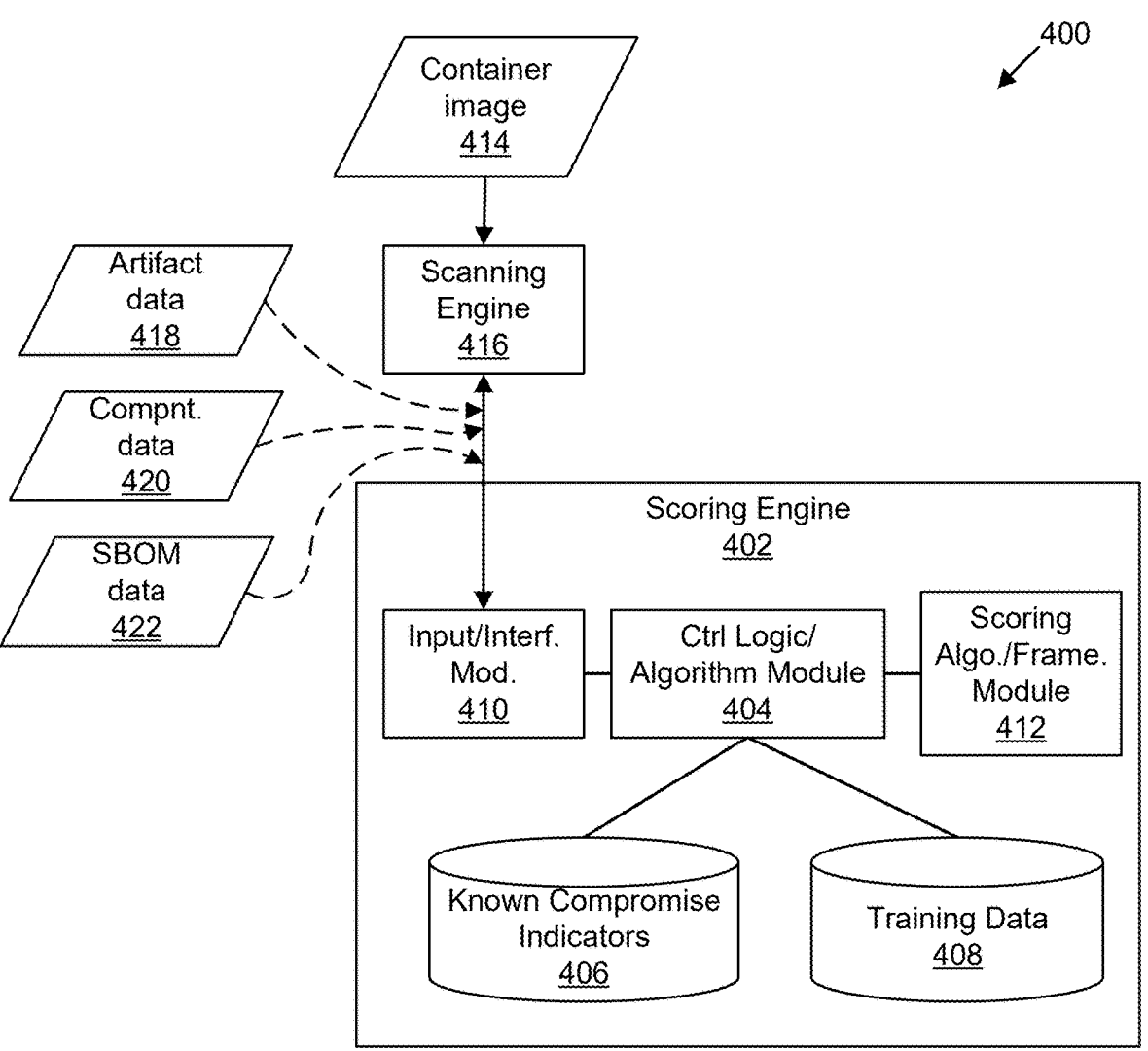
FIG. 4 illustrates an exemplary scoring engine data architecture for data security transactions using software container machine readable configuration data.

FIG. 4 illustrates an exemplary scoring engine data architecture for data security transactions using software container machine readable configuration data. Here, architecture 400 includes scoring engine 402, control logic/algorithm module 404, repositories 406-408, input/interface module 410, scoring algorithm or framework module 412, container image 414, scanning engine 416, artifact data 418, component data 420, and software bill of materials (hereafter "SBOM") data 422. In some examples, scoring engine 402 may be implemented as a scoring engine used by platform 302 (FIG. 3A). Input such as data representing an image of a software container (i.e., container image data 414) may be received and scanned by scanning engine 416 to parse and identify source code for further processing by scoring engine 402 when received by input/interface module 410. Once received, scanned source code (e.g., output of scanning engine 416 to scoring engine 402) may be further processed by using one or more algorithms or frameworks (e.g., SLSA) to process the input source code to identify configuration data. In some examples, control and coordination processes are performed by control logic/algorithm module 404, including referencing identified configuration data (not shown) from the results of processing by scoring algorithm/framework module 412 against, for example, repositories 406-408.

In some examples, repositories 406-408 may be used to store data (e.g., training data for AI, LLM, transformers, algorithms (e.g., machine learning, deep learning, and the like)) such as compromise indicators (i.e., repository 406) or training data (i.e., repository 408) in order for control logic/algorithm module 404 to generate output data identifying changes to configuration data (not shown) retrieved, parsed, and processed from container image 414. In some examples, repository 406 may be configured to store data, metadata, and/or other information such as identifiers or indicators (which may be numerical, statistical, quantitative, or others, without limitation or restriction) associated with known security threats, hacks, or compromises (e.g., "known compromise indicators) that pose security vulnerabilities or threats to a software container, which could lessen its overall or aggregate score (i.e., as generated by scoring engine 402) or scores associated with individual components if the security vulnerabilities or threats are associated with individual components.

For example, scoring engine 402 may be configured to store identifiers (e.g., reference or referenced identifiers associated with known security tools or compromises), record locators, or other types of data indicea, metatags, hash values, or other data indicators used to identify known compromises of software supply chains, software containers, components, or processes thereof in repository 406. Likewise, as scoring engine 402 operates, data may also be stored in repository 408 and retrieved as training data for one or more large language models (hereafter "LLMs") or transformers used in the context of "artificial intelligence" or similar algorithms that may be, in some examples, used by scoring algorithm/framework module 412 to generate a score to be assigned to container image 414 (i.e., a software container), components, or processes thereof. In other examples, training data 408 may also be retrieved from external sources and neither repository 406 nor repository 408 are required to be implemented as internal physical data storage facilities or repositories and may instead be implemented using various types of physical, virtual, local, or remote storage resources, such as cloud computing or networked storage.

In some examples, scanning engine 416 may be configured to scan (i.e., parse and identify) various types of data. Examples of data that may be parsed or identified from container image 414 by scanning engine 415 may include artifact data 418, component data 420, or SBOM data 422. In some examples, artifact data 418 may be data representative of the source code of a software container and or its components, including processes. Likewise, in some examples, component data 420 may be representative of data such as the source code of a component of a software container (not shown). In other examples, artifact data 418 may be duplicative of component data 420 if representative of source code associated with a component of a software container. In other examples, artifact data 418 may be source code for an entire software container, including its components, dependencies, and other elements, such as those described above. Still further, SBOM data 422 may be representative of data such as a manifest or other listing of a software container's content. In some examples, SBOM data 422 may be a list or other compilation of data of a given software container and its supply chain, including identification of security tools used to secure a given software container. In other examples, architecture 400 and elements 402-422, as shown and described, may be varied in structure, function, design, layout, order, quantity, size, shape, configuration, topology, architecture, schema, and implementation and are not limited to solely those examples shown and described, which are provided for purposes of exemplary description.

FIG. 5A illustrates an exemplary process for data security transactions using software container machine readable configuration data. Here, process 500 starts by performing a query within a continuous integration software development environment of a software container (502). Processes (e.g., FIGS. 5A-12) disclosed may utilize standard flowchart symbols and are not to be limited based on the size or dimensions of said symbols, but instead interpreted based on the content therein, the claims, and the accompanying descriptions found within this Detailed Description, without limitation or restriction thereto. In some examples, platform 302 (FIG. 3A) initiates a query to a repository (e.g., repository 116 (FIG. 1A)) to retrieve container image data (e.g., container image 414 (FIG. 4). Once retrieved, the query executed against a software container in a continuous integration software development environment (hereafter "environment") may be parsed by, for example, a scanning engine (e.g., scanning engine 318 (FIG. 3A)) to identify source code and the associated software supply chain and processes for the container and its components (504). Once identified, source code of a software container (i.e., container image data) may be parsed to identify data and information (506). As output parsed from responsive data (i.e., container image or artifact data) sent in response to a query from platform 302 (FIG. 3A), configuration data and/or files (i.e., config data) may be identified and further scanned and processed by platform 302 (FIG. 3A) to identify machine readable code associated with the config data (508).

Once identified, machine readable config data may be processed by evaluating and scoring it using scoring engine 310 (FIG. 3A) based on identification of security tools used with the software container, as parsed, identified, evaluated, and scored by platform 302 (FIG. 3A) (510). Using individual component scores to generate an aggregate score, as described above, a report may be generated in varying detail to provide the aggregate score, individual component score, recommendations for improving security of the software container and its supply chain, identifying missing or corrupted security tools, and other data or information that may be used to further secure a given software container, its included components, dependencies, library, processes, elements, and supply chain. In other examples, process 500 may be varied in function, process, order, step, or other aspects and is not limited to the examples shown and described.

Figure 5B:
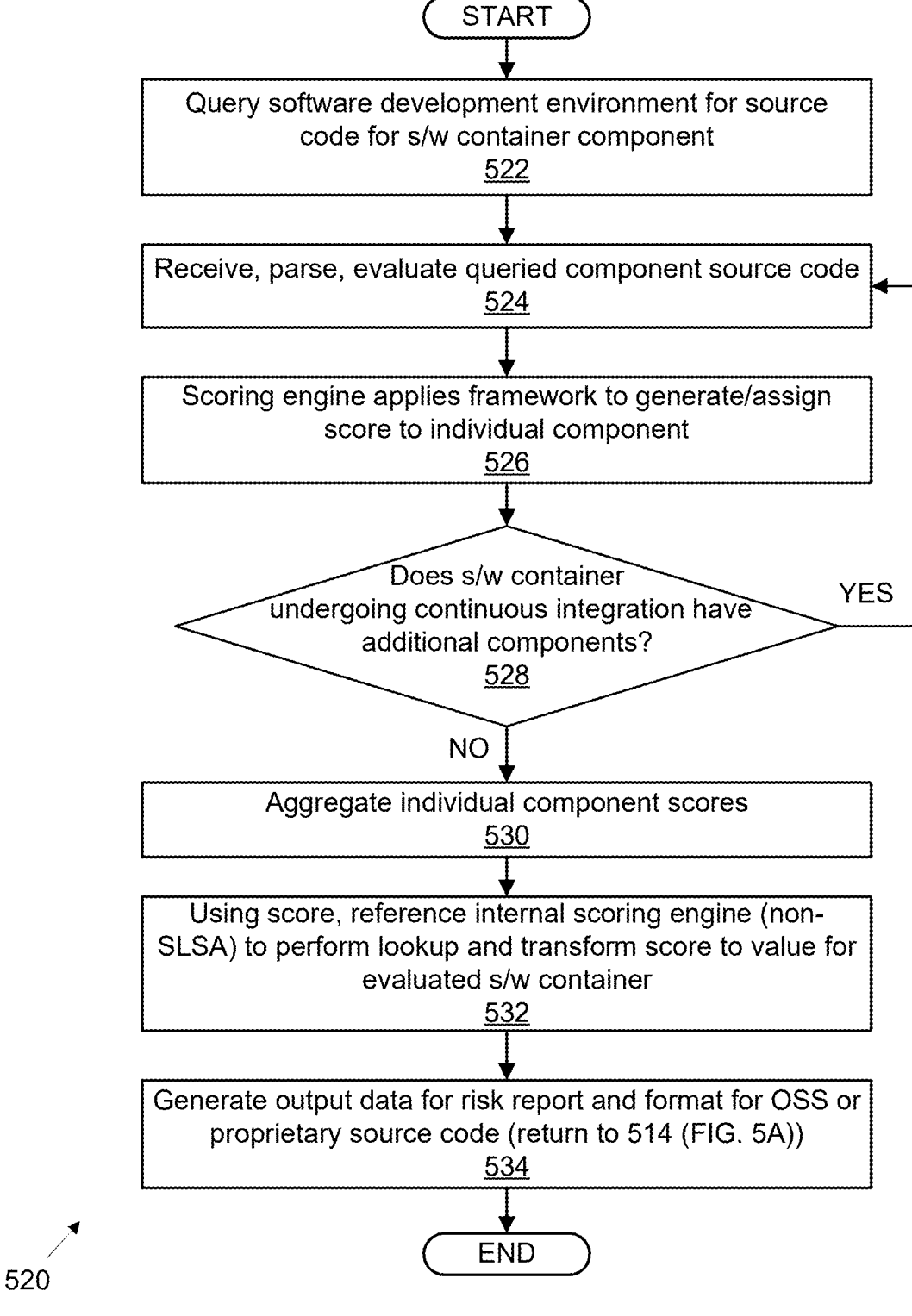
FIG. 5B illustrates a further exemplary process for data security transactions using software container machine readable configuration data.

FIG. 5B illustrates a further exemplary process for data security transactions using software container machine readable configuration data. Here, process 520 begins by generating and transmitting a query of a software development environment (e.g., continuous integration, development, testing, staging, deployment, and others) requesting source code of a given software container (e.g., container image data) (522). Container image data (i.e., source code associated with a software container and its components) sent in response to the query is received, parsed, and evaluated (524). A scoring engine may be used to apply a framework to parsing and evaluating the received source code to generate and assign a score to a component of a software container (526). Next, a determination is made as to whether the software container being evaluated by platform 302 (FIG. 3A) contains another component (528). If there is another component (i.e., "YES"), process 520 performs another evaluation of the identified component. If "NO," then process 520 continues.

In some examples, once components of a given software container have been evaluated and scored, an aggregate score for the software container may be generated (530). Using the aggregate score for the software container, a lookup (i.e., reference call to one or more libraries having indices or other scores against which to measure the software container under evaluation) may be performed and then a data transformation (e.g., converting the score to a hash value or the like) may be performed to assign a unique identifier to the software container undergoing evaluation (532). In so doing, the reference lookup provides data that may be used to identify a risk level or security classification level for the software container undergoing evaluation by platform 302. In some examples, scores assigned to components may be used to identify the presence of a given security tool or the alteration of source code found from evaluating parsed source code associated with a given component or source code. Still further, individual component scores may be compiled to generate an aggregate score for a given software container. Once generated, scores may be included in output data that is used to generate a risk assessment for a given open source or proprietary software container, which may be output to one or more client terminals or displays in data communication, locally or remotely networked, with platform 302 (FIG. 3A) (534). In other examples, process 520 may be varied in function, process, order, step, or other aspects and is not limited to the examples shown and described.

FIG. 6 illustrates an alternative exemplary process for data security transactions using software container machine readable configuration data. Here, process 600 starts by performing a query of a continuous integration software development environment (regardless of development stage (e.g., development, testing, staging, deployment, and others, without limitation or restriction) of a software container (602). Using responsive data received in response to a query of a given software container, identification of the software supply chain and processes (i.e., artifacts) is performed to identify source code associated with the given software container (604). Next, the identified source code is parsed (606) and platform 302 (FIG. 3A) scans and evaluates the parsed and identified source code to further identify configuration data of a software container under evaluation (608). Machine readable program or source code of the configuration data is identified and then used to perform a further evaluation and scoring of the config data based on reference calls and comparisons of the evaluated source code to one or more libraries to determine whether a change to the config code has occurred (610). The scoring of individual components may be used to generate an aggregate score and, subsequently, a report detailing an overall security score for a given software container, the score being further representative of the presence or lack of security tools and recommendations for increasing or improving the overall security score (612). In other examples, process 600 may be performed differently and varied in function, process, order, step, or other aspects and is not limited to the examples shown and described.

FIG. 7 illustrates another alternative exemplary process for data security transactions using software container machine readable configuration data. Here, process 700 starts when a repository (e.g., closed source (i.e., proprietary software that is not open source software) internal repository 204 (FIG. 2), open source internal repository 206 (FIG. 2), external repository 208 (FIG. 2), or others, regardless of whether configured to store, return (in response to a query), or perform other data operations or transactions on proprietary or open source software code or artifacts of software containers, without limitation or restriction as to the type, number, language, data communication protocol) returns data related to a software container (e.g., software container data, data representing source code of a software container or a component thereof, or other data representative of the supply chain for a software container or an individual component or sub-element of a software container) to a querying platform (e.g., platform 102 (FIG. 1A), platform 202 (FIG. 2), (software) container security evaluation platform 302 (FIG. 3A), or others, any or all of which may be referred to interchangeably in this Detailed Description as "platform") (702). Once received, responsive software container data (hereafter "data") may be parsed to identify or determine source code associated with a software container, its components, or the supply chains associated with the software container overall of its individual components (704). Parsing data returned to a platform (e.g., e.g., platform 102 (FIG. 1A), platform 202 (FIG. 2), (software) container security evaluation platform 302 (FIG. 3A), or the like) may be perform by evaluating source code associated with a software container to determine individual components (e.g., applications, dependencies, binaries, libraries, or others, without limitation or restriction) and, once determined or identified, a software container and its components may be assigned identifiers.

In some examples, a scoring engine such as those described in this Detailed Description, may be invoked (706) to generate and assign identifiers based on the identification of a security tool or application that is found within the software container. For example, an encryption module (and its dependencies) found within and used by a given software container (not shown) may be identified when platform 302 (FIG. 3) parses source code received in response to a query. The identifier may then be referenced by platform 302 may performing a reference call or lookup of a data repository that includes a list, table, or other data structure that stores known or common identifiers of security tools. If a match occurs, scoring engine 402 (FIG. 4) may generate a score that is configured to assign a quantitative value to a component for its use and inclusion with a given software container. Likewise, if a given identifier is not found, a different quantitative value for a score may be assigned to represent the lack of a given security tool, type of security tool, category of security tool, or the like. Still further, if a reference call or lookup from platform 302 (which may be performed by generating a service or application call to another platform, module, or application, any of which may be local, remote, networked, virtual, physical, or the like) does not result in a match, then a different or no value may be assigned to a given score associated with the software container or its components. In some examples, one or more scoring engines (e.g., scoring engine 402 (FIG. 4)) may instantiate, call, or invoke one or more algorithms that, when executed against data (e.g., source code of a software container, components or supply chain thereof) can be used to evaluate and generate a score associated with a software container or any of its individual components, such as those described above (708). Algorithms executed by a platform or its individual modules (e.g., logic modules, scoring engines, and others, without limitation or restriction) such as those shown and described in FIG. 3A, may be varied and are not limited to any specific type, quantity, form, or format. For example, algorithms directed to using machine-learning, deep learning, large language modules or "artificial intelligence"-oriented algorithms (open or closed, supervised or unsupervised, trained or untrained), and others, without limitation or restriction, may be used by a platform to evaluate a software container, components and supply chain thereof, and associated source code.

Referring back to FIG. 7 and process 700, individual scores may be generated for each component of a software container (710). Using individually-generated scores from one or more scoring engines (e.g., scoring engines 342-348 (FIG. 3B)), platform 302 (FIG. 3A) may invoke one or more modules to generate an aggregate score (e.g., aggregate scoring engine 350 (FIG. 3B) to generate an overall or aggregate score for a software container (712). In other words, a score generated by platform 302 (FIG. 3A) may be generated by using individual scores or sub-scores of components or the supply chain(s) or source code thereof by summing, aggregating, or performing other data or mathematical operations on the values of the scores including using weighting, statistical normalization techniques, performing Fourier transformations, or other techniques to generate individual or aggregate scores, without limitation or restriction. In other examples, process 700 may be performed differently and varied in function, process, order, step, or other aspects and is not limited to the examples shown and described.

FIG. 8 illustrates an exemplary process for report generation in data security transactions using software container machine readable configuration data. Here, process 800 begins by receiving an artifact in response to a data query (i.e., query) generated by platform 302 (FIG. 3A) and sent to a repository storing data associated with one or more software containers, regardless of whether the repository is in data communication with platform 302 locally, remotely, physically, virtually, wired, wirelessly, regardless of data communication protocol or topology (802). Once received, an artifact may be parsed to identify source code associated with, for example, a software container, one or more components thereof, and/or a supply chain for the software container and its component(s) (804). In some examples, a software supply chain may be encoded using various types of data, computer programming languages or formats to identify sources (e.g., target sources) for a software container and components thereof.

In some examples, once parsed, platform 302 (FIG. 3A) may invoke by sending control signals from logic module 304 (FIG. 3A) to scoring engine 310 (FIG. 3A) to generate scores for individual components of a software container as well as an aggregate score for the software container (806). As an example, various techniques may be used to generate a score or aggregate score and are not limited to those shown and/or described. For example, a software container security framework such as SLSA (i.e., Supply-chain Levels for Software Artifacts) as developed by The Linux Foundation may be used to evaluate the security of a software container by patterning or filtering attributes of software containers to determine whether expected developers or known factors related to the development of certain components are present. If a given component is not identified as being developed by a known developer, a framework such as SLSA may indicate a potential security threat or vulnerability that may result in a lower score being assigned to a given component by platform 302 (FIG. 3A). Likewise, the use of a framework such as SLSA may also indicate or result in high quantitative scores being assigned to component(s) if known and trusted developers, in accordance with those identified by a framework used to analyze or evaluate a given software container, are present.

Referring back to process 800, after scores have been generated and assigned to individual components of a software container and an aggregate score has been assigned to a software container based on those scores, regardless of how the scores are generated, then a report may be generated by, for example, report generator 320 (808). In some examples, a report may include an attestation from platform 302 (FIG. 3A) that a given software container has an aggregate score that is high due to the presence of security tools, lack of known compromise indicators, high pass rate using a security analysis framework (e.g., SLSA), or other factors. In still other examples, a certification may also be generated by, for example, attestation module 312 which, when included with a report that is generated and rendered for display on a client or user terminal or display (not shown) may indicate a level of data security or trustworthiness. Conversely, security vulnerabilities or threats may also be indicated in a generated report from platform 302 (FIG. 3A) and, when provided, additional details may be included such as high failure rate of applying a framework (e.g., SLSA) to a software container and its components, the presence of known compromise indicators, or the like, without limitation or restriction. In other examples, process 800 may be performed differently and varied in function, process, order, step, or other aspects and is not limited to the examples shown and described.

FIG. 9A illustrates an exemplary process of using file system rewrites to perform continuous integrity checks in software container data. Here, process 900 starts by transmitting a query from a software container security platform (e.g., platform 302 (FIG. 3A), or others, as shown and described herein) to a container registry (902). In some examples, responsive data representing or corresponding to a requested software container may be received at the platform (904). Once received, a software platform may be parsed to identify a data structure that, in some examples, corresponds to a file structure (906). Examples of file structures that may be used in software containers may include "tarballs" or .TAR file structures (i.e., Tape Archive files), SquashFS, or other file structures, without limitation or restriction.

Here, a file structure may be used to organize how data is stored in a given software container, including immutable and mutable file structures that may store data in blocks. Once a file structure is determined, platform 302 (FIG. 3A) may be configured to rewrite a given software container file structure into a different file structure (906). For example, platform 302 (FIG. 3A) may be configured to rewrite the file system of a software container from a .TAR format to a SquashFS format (i.e., immutable to mutable) in which additional data, information, tags, semantic information, or other data may be included. For example, platform 302 (FIG. 3A) may be configured to rewrite a software container using a .TAR file system or other OCI standards compliant file system or format into a SquashFS file system. By doing so, additional information and/or data may be added to provide or reinforce data integrity and related attributes of the software container. In some examples, kernel-level functionality or modules such as a device mapper (as used in Linux and other operating systems) may be used to add integrity information to the file system or blocks of data of a software container (908). As described throughout this Detailed Description, any type of data found, stored, or otherwise contained within the data structures of a software container may be validated using any of the techniques described, without limitation or restriction. Data in a software container may, for example, be payload data, configuration data, formatting data, transmission or communication protocol data for formatting, or others, without limitation or restriction. Thus, when a software container is retrieved, mounted (i.e., loaded, installed, called, served, retrieved, or the like), and run (i.e., executed), operating system-level components such as dm-verity, a device mapper often found installed or implemented within the kernel of Linux operating systems, may be used to provide data integrity information for the software container to ensure the validity of any data found within a software container and which may be later identified and confirmed before, during, or after the runtime execution (i.e., container runtime) of a software container. In other words, platform 302 (FIG. 3A) may be configured to evaluate a software container file system that has been rewritten to include data integrity data using a device mapper (e.g., dm-verity) to confirm whether changes to machine readable configuration data have been detected or modifications have been made that were previously not present in the software container as originally stored in a container registry (912). In other examples, process 900 may be performed differently and varied in function, process, order, step, or other aspects and is not limited to the examples shown and described.

Figure 9B:
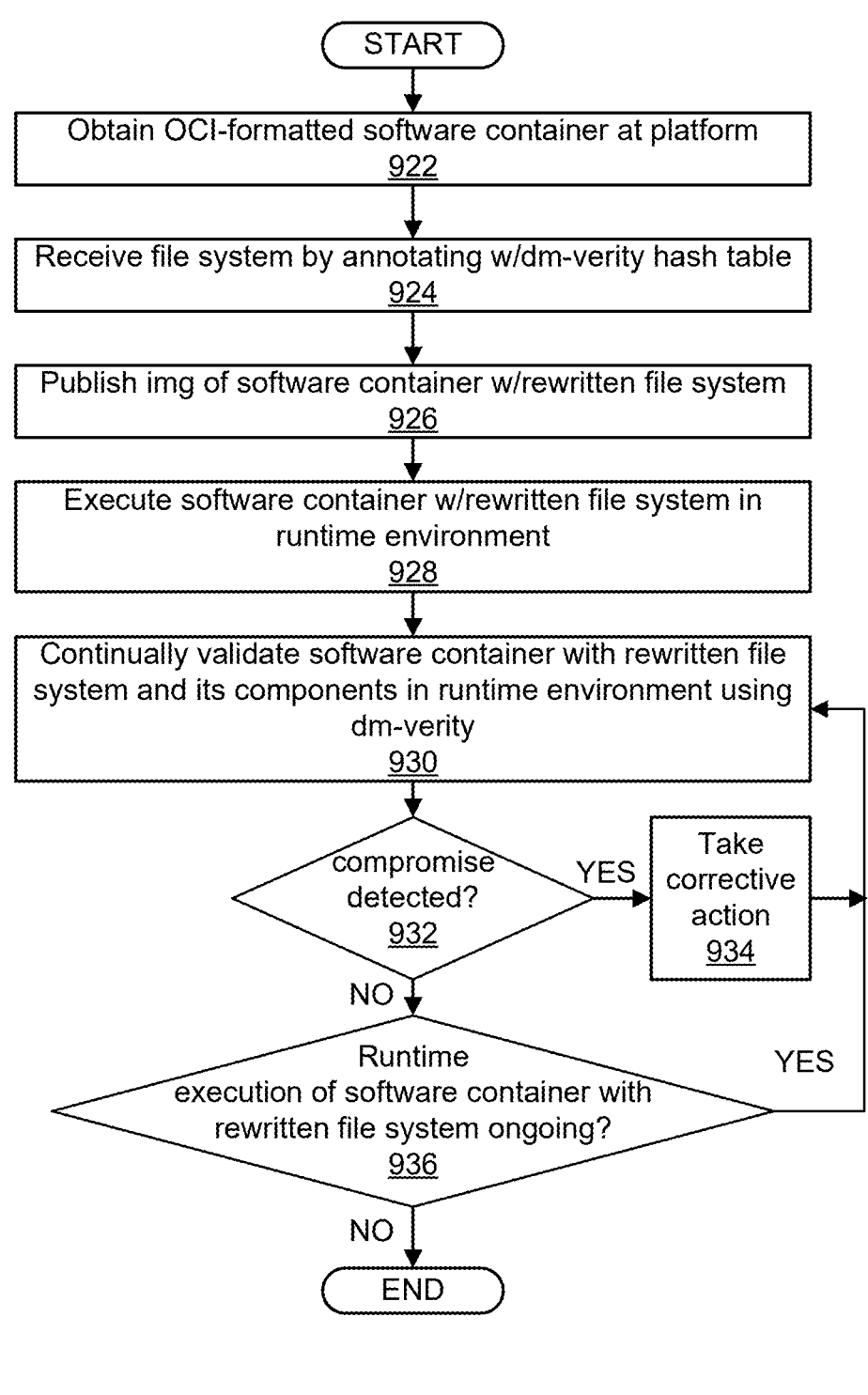
FIG. 9B illustrates an alternative exemplary process of using file system rewrites to perform continuous integrity checks in software container data.

FIG. 9B illustrates an alternative exemplary process of using file system rewrites to perform continuous integrity checks in software container data. Here, process 920 starts by obtaining an OCI-formatted or compliant software container (922). Obtaining an OCI-formatted or compliant software container may be performed when a platform (e.g., platform 102 (FIG. 1A), platform 122 (FIG. 1B), platform 202 (FIG. 2), container security evaluation platform 302 (FIG. 3A), and the like, without limitation or restriction) receives a requested container (i.e., as a copy pushed to said platform, as responsive data received in response to query requesting a given container, or as an inline or composite process intended to analyze (i.e., evaluate) a software container prior to, during, or after runtime execution to determine if anomalies, modifications, alterations, deletions, additions, or other changes may have occurred to any, some, or all components of a software container.

Once obtained, in some examples, a software container received by a platform such as those described above may have its file system (the term "file system" may be interchangeably used with "filesystem") rewritten to include (i.e., annotate) validity or verification information such as an embedded hash for each component of the software container (924). In some examples, multiple hashes may be used in which case an embedded hash table such as that provided by a device mapper such as dm-verity may be used to provide a cryptographic hash embedded with each block of data storage contained within a software container and/or a data container. In other examples, other features may also be included such as compression algorithms that are used to compress, for example, hash tables that are embedded or included with each block of data for each component of a software container and which act as "targets" for processes to use when verifying whether a given block of data in a software container has changed or been modified. In still other examples, other types of cryptographic techniques or algorithms, alone or in combination, may be used to provide data verification functionality such as that described above.

Upon rewriting a software container, its components, and annotating (e.g., embedding hashes, hash tables, or the like) verification information such as that provided by dm-verity (a compatible data verification function within the kernel of a Linux® operating system that is used to verify the data integrity of, for example, OCI-compatible/compliant software containers), the rewritten software container may be published to, for example, a registry, local file system, daemon (e.g., Docker daemon, Kubernetes daemon, or the like, regardless of whether OCI compatible), or other repository from which the published image may be retrieved (926). Subsequently, the software container with the rewritten filesystem may be executed at runtime (i.e., within a runtime environment) while using the embedded verification information to continuously monitor and verify, at a data block level, the software container (928). In some examples, continuously evaluating or validating the data integrity of a software container (i.e., with the rewritten filesystem containing embedded validation or verification data such as hashes, hash tables, or the like) and its components may be performed during the entire time a software container is being executed (i.e., executed at runtime or in a runtime environment) (930).

Next, a determination is made as to whether a compromise has been detected (932). In some examples, a compromise, in some examples, may be a detected change, modification, addition, deletion, or other alteration of data in a software container evaluated (i.e., analyzed) at runtime, as described above. If a compromise is detected, then correction action may be taken (934). Examples of corrective actions may include, but are not limited to restarting execution of the software container and/or its components with the rewritten file system, generate and transmit data or signal(s) from, for example, platform 302 (FIG. 3A) to a destination such as a security platform. In some examples, the generation of data or signal(s) may be representative of an alert that a software container under execution may have a data integrity or security threat that requires intervention or another action to prevent further data corruption, malware, vulnerabilities, or other deleterious effects resulting from the execution of the identified software container and/or its components. Still other actions may be taken such as isolating a software container containing a compromise, known or otherwise, without limitation or restriction.

After analyzing the data blocks (i.e., data) of a software container and its components having a rewritten filesystem including embedded validity data (e.g., hashes, hash tables, and the like, without limitation or restriction), and no further compromises are detected, a further determination is made as to whether the software container is still undergoing execution in a runtime environment (936). If so, validation analysis (i.e., evaluation) is continuously repeated (e.g., 930-936) until such time the software container is no longer being executed at runtime and this is detected, at which time process 920 ends. In other examples, process 920 may be performed differently and varied in function, process, order, step, or other aspects and is not limited to the examples shown and described.

Figure 10A:
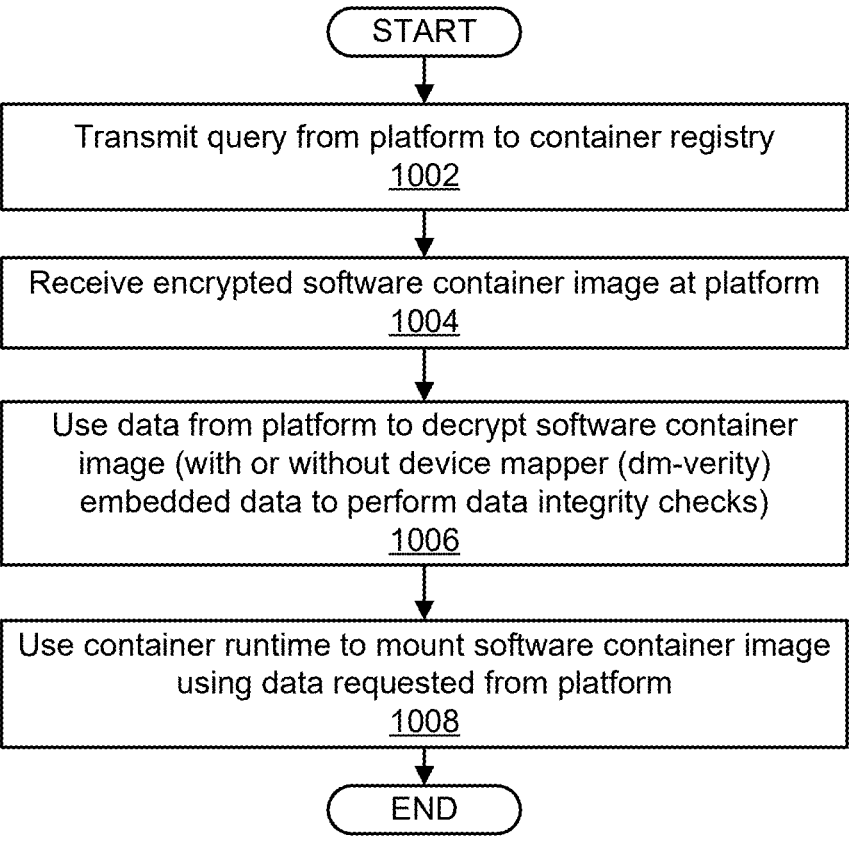
FIG. 10A illustrates an exemplary process for decrypting and mounting a software container image.

FIG. 10A illustrates an exemplary process for decrypting and mounting a software container image at runtime. Here, process 1000 starts by transmitting a query (i.e., data structured by a sending source to request responsive data and transmitted using a computing network to a destination) from a platform such as those described herein (e.g., platform 302 (FIG. 3A)) to a container registry, the latter of which may be implemented as any type of storage device, appliance, or facility that is configured as a storage volume to store a software container, data container, or data related to software containers (1002). Once received, responsive data (e.g., an encrypted or unencrypted software container and its components) along with "key material" (i.e., data that may be interpreted by platform 302 (FIG. 3A) or others to encrypt or encrypt data or data blocks of a software container and its components) is received by platform 302 and used to decrypt an encrypted software container prior to execution (1004). In other examples, an encrypted software container may also be decrypted prior to or after execution in a runtime environment.

Once received, an encrypted software container may be decrypted by platform 302 (FIG. 3A) by performing a data operation or transformation on data, which may be in a data structure composed of one or more blocks of data in a file system of an encrypted software container in order to determine whether a compromise to the data integrity has been detected. Using techniques such as those described above in connection with FIG. 9B (as an example), data may be added by a device mapper (e.g., dm-verity or others, without restriction or limitation) and used to detect a compromise (e.g., a data-level or data block-level change, addition, deletion, or other modification has occurred) to a software container prior to, during, or after execution (1006). In some examples, data integrity information and data from, for example, a device mapper integrated as a feature to an operating system kernel (e.g., Linux kernel) such as dm-verity may be optionally used to embed "integrity data" such as a hash or hash table in the data or data blocks of a software container and used to determine if a change has occurred to the software container, its components, or contents (e.g., data). In other examples, data integrity information and data such as an embedded hash or hash table is optionally used, embedded, or otherwise included with an image of a rewritten file system (e.g., SquashFS-based image).

In some examples, decryption of an encrypted software container may be executed or performed by requesting a decryption key (i.e., "key") or "key material" from platform 302 (FIG. 3A) to authenticate and apply to an encrypted software container. Once decrypted, a software container (e.g., software container image, software container image data, or the like) may be mounted and executed in a container runtime (i.e., runtime environment) (1008). In other words, a container runtime (e.g., runtime environment 124 (FIG. 1B)) may be configured to obtain an encrypted software container image and then platform 302 (FIG. 3A) may further process the encrypted software container image to obtain key material that provides a decryption key that may be used to decrypt the image (i.e., data) of an encrypted software container. Once decrypted, platform 302 may generate a request or other signal or data to an operating system kernel (not shown) to mount and then invoke a runtime environment (e.g., runtime environment 124 (FIG. 1B)) to execute the decrypted software container and its components. As used herein, "mounting" may refer to a stage, process, or set of processes of an operating system or environment and directed by platform 302 (FIG. 3A) that decrypt (e.g., prior to, during, or after execution) and execute a software container. In other examples, process 1000 may be performed differently and varied in function, process, order, step, or other aspects and is not limited to the examples shown and described.

Figure 10B:
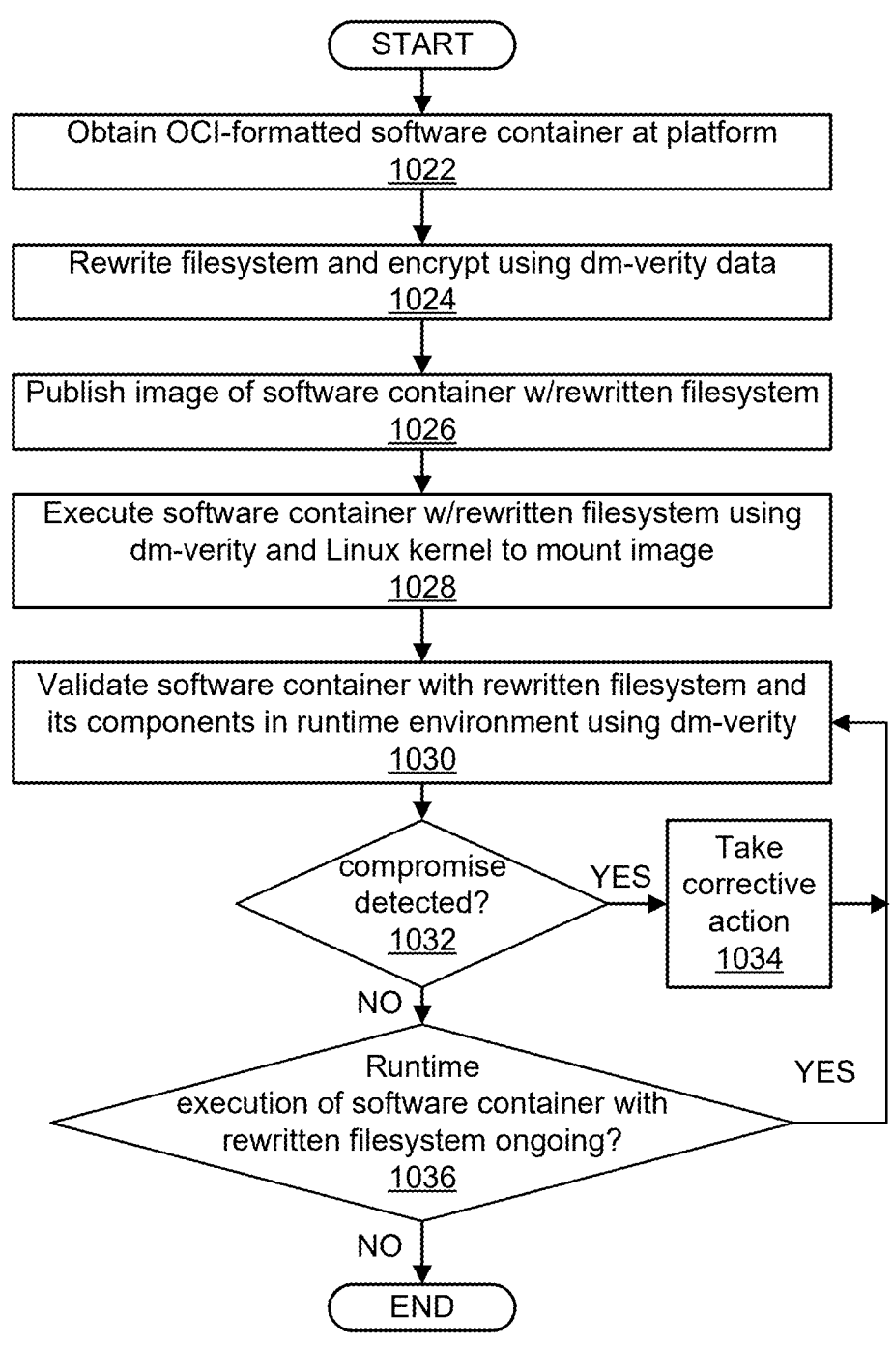
FIG. 10B illustrates an alternative exemplary process for decrypting and mounting a software container image.

FIG. 10B illustrates an alternative exemplary process for decrypting and mounting a software container image. Here, process 1020 begins by obtaining an OCI-formatted or compliant software container (1022). Obtaining an OCI-formatted or compliant software container may be performed when a platform (e.g., platform 102 (FIG. 1A), platform 122 (FIG. 1B), platform 202 (FIG. 2), container security evaluation platform 302 (FIG. 3A), and the like, without limitation or restriction) receives a requested container (i.e., as a copy pushed to said platform, as responsive data received in response to query requesting a given container, or as an inline or composite process intended to analyze (i.e., evaluate) a software container prior to, during, or after runtime execution to determine if anomalies, modifications, alterations, deletions, additions, or other changes may have occurred to any, some, or all components of a software container.

Once obtained, in some examples, a software container received by a platform such as those described above may have its file system (the term "file system" may be interchangeably used with "filesystem") rewritten to include (i.e., annotate) validity or verification information such as an embedded hash for each component of the software container (1024). In other examples, as with that shown and described above in connection with FIG. 9B, rewriting a file system using, for example, integrity data from a device mapper (e.g., dm-verity) or other kernel-level feature, may be optional. In other words, a rewritten file system may be encrypted with or without embedding integrity data (e.g., data from dm-verity or another kernel-level feature). Data (e.g., block-level data) of a software container and its components may be encrypted and/or decrypted with or without integrity data. When encrypted, annotated data may be included with an image of a software container and its rewritten file system to provide information and data that may be used to encrypt and/or decrypt a software container upon receipt, prior to runtime, during execution in a runtime environment, or at other times during the processing of the software container (or, in some examples, a data container such as those described herein).

In some examples, multiple hashes may be used in which case an embedded hash table such as that provided by a device mapper such as dm-verity may be used to provide a cryptographic hash embedded with each block of data storage contained within a software container and/or a data container. In other examples, other features may also be included such as compression algorithms that are used to compress, for example, hash tables that are embedded or included with each block of data for each component of a software container and which act as "targets" for processes to use when verifying whether a given block of data in a software container has changed or been modified. In still other examples, other types of cryptographic techniques or algorithms, alone or in combination, may be used to provide data verification functionality such as that described above.

Upon rewriting a software container, its components, and annotating (e.g., embedding hashes, hash tables, or the like)

verification information such as that provided by dm-verity (a compatible data verification function within the kernel of a Linux® operating system that is used to verify the data integrity of, for example, OCI-compatible/compliant software containers), the rewritten software container may be published to, for example, a registry, local file system, daemon (e.g., Docker daemon, Kubernetes daemon, or the like, regardless of whether OCI compatible), or other repository from which the published image may be retrieved (1026). Subsequently, the software container with the rewritten filesystem may be executed at runtime (i.e., within a runtime environment) while using the embedded verification information to continuously monitor and verify, at a data block level, the software container (1028). In some examples, continuously evaluating or validating the data integrity of a software container (i.e., with the rewritten filesystem containing embedded validation or verification data such as hashes, hash tables, or the like) and its components may be performed during the entire time a software container is being executed (i.e., executed at runtime or in a runtime environment) (1030). In other words, continuous monitoring of a software container for data integrity may be performed using a process similar to that described above in connection with continuous validation as described in FIG. 9B (i.e., 930-936).

Referring back to FIG. 10B, a determination is made as to whether a compromise has been detected (1032). In some examples, a compromise, in some examples, may be a detected change, modification, addition, deletion, or other alteration of data in a software container evaluated (i.e., analyzed) at runtime, as described above. If a compromise is detected, then correction action may be taken (1034). Examples of corrective actions may include, but are not limited to restarting execution of the software container and/or its components with the rewritten file system, generate and transmit data or signal(s) from, for example, platform 302 (FIG. 3A) to a destination such as a security platform. In some examples, the generation of data or signal(s) may be representative of an alert that a software container under execution may have a data integrity or security threat that requires intervention or another action to prevent further data corruption, malware, vulnerabilities, or other deleterious effects resulting from the execution of the identified software container and/or its components. Still other actions may be taken such as isolating a software container containing a compromise, known or otherwise, without limitation or restriction.

After analyzing the data blocks (i.e., data) of a software container and its components having a rewritten filesystem including embedded validity data (e.g., hashes, hash tables, and the like, without limitation or restriction), and no further compromises are detected, a further determination is made as to whether the software container is still undergoing execution in a runtime environment (1036). If so, validation analysis (i.e., evaluation) is continuously repeated (e.g., 1030-1036) until such time the software container is no longer being executed at runtime and this is detected, at which time process 1020 ends. In other examples, process 1020 may be performed differently and varied in function, process, order, step, or other aspects and is not limited to the examples shown and described.

Figure 11:
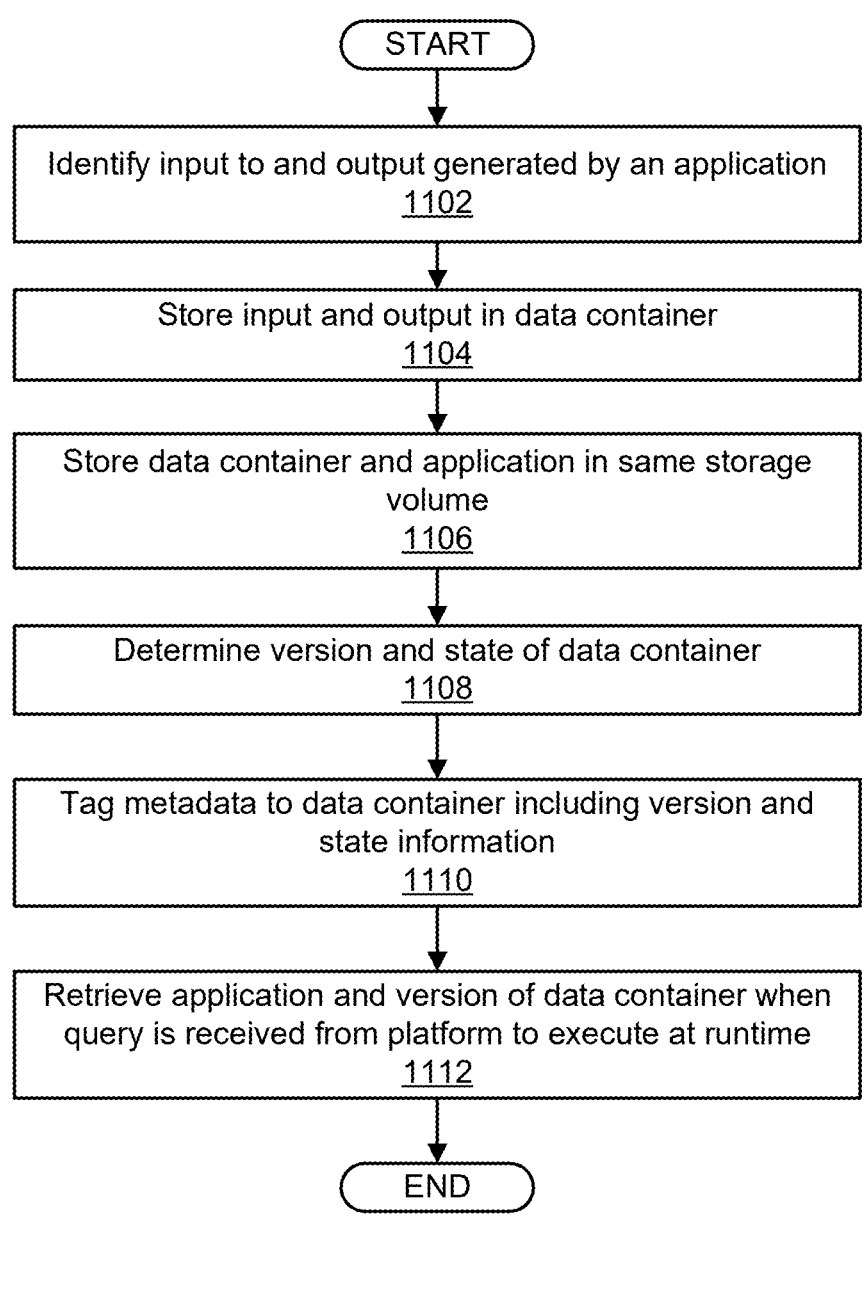
FIG. 11 illustrates an exemplary process for generating and managing data containers storing input and output data for use by applications that may be containerized in software containers.

FIG. 11 illustrates an exemplary process for generating and managing data containers storing input and output data for use by applications that may be containerized in software containers. Here, process 1100 starts by identifying input data to and output data from (i.e., generated by the application) (1102). An application, as used herein, may be any type of application that, when executed, receives input data, performs one or more processes, and then generates output data. In some examples, an application may be "containerized" (i.e., stored, reposited, or otherwise contained) within a software container, such as those described herein. In other examples, process 1100 may be performed on applications that are not stored in a software container.

Here, in some examples, input(s) and output(s) are then stored in a data container, a data structure that is configured to store input data to an application and output data generated by the application (i.e., when the inputs are provided to the application at runtime). As described herein, an application may be stored in a storage volume that has been modified to store data containers and, in some examples, a software container (1104). For example, data related to an application (regardless of whether containerized in a software container) may be stored apart from data that may be related to a given time, state, event, data operation, data transformation, or other function of an application. Once the desired input(s) and output(s) are stored in a data container, the data container and, if an application is containerized in a software container, its associated software container(s) may be stored together in a same or different storage volume (1106).

In some examples, before, during, or after the process of storing data containers, uncontainerized applications, and/or software containers together in a storage volume, version and state(s) of a data container may be determined and identified (e.g., tagged with identifying data such as metadata) to facilitate retrieval if a particular application or software container is requested (i.e., queried) for execution and specific data (e.g., key material for decrypting a software container, or the like) is requested (1108-1110). Using tagged data of a data container, a software container, a non-containerized application, and/or a data container may be retrieved from a common storage volume using version and state data as attributes to identify specific instantiations thereof (1112). In other examples, software containers, applications, and/or data containers may also be stored apart or in the same "virtual" storage device, appliance, or service, without regard to actual physical hardware or other logical data storage structures or schema. In other examples, process 1100 may be performed differently and varied in function, process, order, step, or other aspects and is not limited to the examples shown and described.

FIG. 12 illustrates an exemplary process for generating and managing writeable data containers. Here, process 1200 starts by identifying input(s) to and output(s) generated by a software container (1202). In some examples, input(s) and output(s) may be stored in a data container (1204). After storing the input(s) and output(s) to a given software container in a data container, the software container and the data container may be stored together in a storage volume (1206). As described above, a software container and data container may be stored physically, virtually, logically, together or apart, without regard to a specific data storage architecture, schema, structure, or topology, regardless of the quantity, type, configuration, or other characteristics of storage device (s), storage appliance(s), or storage service(s), such as computing cloud-based storage, or the like, without limitation or restriction.

Referring back to FIG. 12, before, during, or after storage, a version and state of a data container may be determined, in some examples. (1208). After determining the version and state version of data associated with a software container (e.g., inputs, outputs, algorithms, applications, services, or other functionality called, implemented, or executed by a software container during runtime), identifiers such as metadata may be "tagged" (i.e., recorded, assigned, labeled, identified, or otherwise associated with) to a data container, including version and state data and information (1210). Once tagged with state and version data, among others, without limitation or restriction, a data container may be encrypted using a key or other encryption/decryption, authentication, or other techniques to generate an encrypted data container (1212). Finally, a software container and an encrypted data container may be retrieved together when a query is received.

In some examples, a query may be structured to include a version, state, or other requesting attributes or characteristics of a software container that, consequently, references an encrypted data container having a given version and/or state. In other words, if a platform (e.g., platform 302 (FIG. 3A)), host (hosts 134-136 (FIG. 1), or other runtime environment (e.g., runtime environment 104 (FIG. 1A), runtime environments 124, 138-140 (FIG. 1B), source targets 328-332 (FIG. 3A), or others, without limitation or restriction to those shown and described) generates a query for a given software container operating on or using sensitive data (i.e., any type of data that is secure or sensitive in nature and requires additional security, encryption, or protection from compromise), attributes may be included within a query including requesting a version, a state (e.g., secure, unsecure, encrypted, unencrypted, and others, without limitation or restriction) to retrieve a software container and a data container or encrypted data container associated with a given time, data, event, transaction, or other state. In still other examples, when an encrypted data container is generated, a software container configured to use data (e.g., inputs, outputs, or the like) in an encrypted data container may be retrieved in response to a query, as described above (1214). Also, in further examples, data integrity checks may be performed using techniques such as those described above in connection with FIGS. 9B and 10B. In yet further examples, process 1200 may be performed differently and varied in function, process, order, step, or other aspects and is not limited to the examples shown and described.

Figure 13:
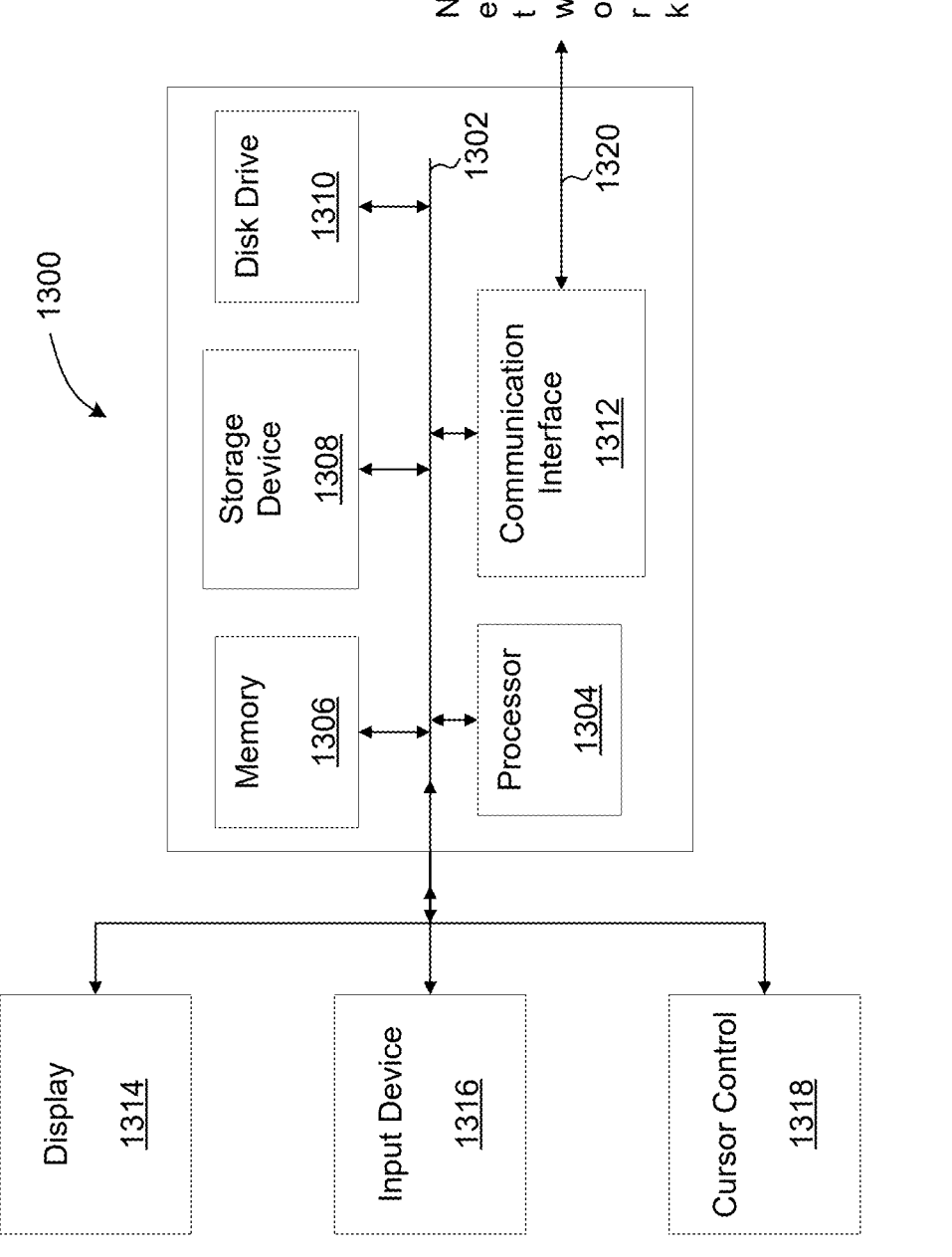
FIG. 13 illustrates an exemplary computing system suitable for data security transactions using software container machine readable configuration data.

FIG. 13 illustrates an exemplary computing system suitable for data security transactions using software container machine readable configuration data. Here, system 1300 may be used to implement or call (i.e., execute an application or service call over a data network) to other services, applications, or platforms to perform the above-described techniques. Computing system 1300 includes a bus 1302 or other communication mechanism for communicating information, which interconnects subsystems and devices, such as processor 1304, system memory 1306 (e.g., RAM), storage device 1308 (e.g., ROM), disk drive 1310 (e.g., magnetic or optical), communication interface 1312 (e.g., modem or Ethernet card), display 1314 (e.g., CRT or LCD), input device 1316 (e.g., keyboard), cursor control 1318 (e.g., mouse or trackball), communication link 1320, and network 1322.

According to some examples, computing system 1300 performs specific operations by processor 1304 executing one or more sequences of one or more instructions stored in system memory 1306. Such instructions may be read into system memory 1306 from another computer readable medium, such as static storage device 1308 or disk drive 1310. In some examples, hard-wired circuitry may be used in place of or in combination with software instructions for implementation.

The term "computer readable medium" refers to any tangible medium that participates in providing instructions to processor 1304 for execution. Such a medium may take many forms, including, but not limited to, non-volatile media and volatile media. Non-volatile media includes, for example, optical or magnetic disks, such as disk drive 1310. Volatile media includes dynamic memory, such as system memory 1306.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1302 for transmitting a computer data signal.

In some examples, execution of the sequences of instructions may be performed by a single computer system 1300. According to some examples, two or more computing system 1300 coupled by communication link 1320 (e.g., LAN, PSTN, or wireless network) may perform the sequence of instructions in coordination with one another. Computing system 1300 may transmit and receive messages, data, and instructions, including program (i.e., application code) through communication link 1320 and communication interface 1312. Received program code may be executed by processor 1304 as it is received, and/or stored in disk drive 1310, or other non-volatile storage for later execution. In other examples, the above-described techniques may be implemented differently in design, function, and/or structure and are not intended to be limited to the examples described and/or shown in the drawings.

Although the foregoing examples have been described in some detail for purposes of clarity of understanding, the above-described techniques are not limited to the details provided. There are many alternative ways of implementing the above-described invention techniques. The disclosed examples are illustrative and not restrictive.

What is claimed:

1. A method, comprising:

receiving at a platform in response to a query, an artifact associated with a software container;

parsing the artifact to identify source code of the software container and a supply chain;

rewriting a filesystem of the software container to include verification information for each component of the software container, the verification information being used to validate data integrity of the software container executed in a runtime environment;

invoking a scoring engine configured to generate a score associated with at least one component of the software container and an aggregate score of the software container, the aggregate score being based on a security tool being included with the software container, either the score or the aggregate score, or both, being determined as a function of whether data in the software container is modified in which the data integrity of the software container is compromised; and generating a report from the platform, the report being associated with the software container and the report including an attestation comprising the score and the aggregate score.

2. The method of claim 1, wherein the software container is analyzed, comprising the each of the one or more components being evaluated by the scoring engine.

3. The method of claim 1, wherein the artifact comprises the source code.

4. The method of claim 1, wherein the artifact comprises a portion of the source code of the software container.

5. The method of claim 1, wherein the artifact comprises a copy of the software container.

6. The method of claim 1, wherein the artifact comprises a copy of the software container, the copy being stored in a repository in data communication with a platform integrating the scoring engine.

7. The method of claim 1, wherein the scoring engine generates a quantitative value of the score.

8. The method of claim 1, wherein the scoring engine generates a quantitative value of the score by executing an algorithm invoked by the platform.

9. The method of claim 1, wherein the scoring engine generates a quantitative value of the score by evaluating the source code using a framework, the framework being used to evaluate the component and the software container to determine whether the software container includes the security tool.

10. The method of claim 1, wherein the report is generated by the platform by performing a reference call to a repository listing one or more security tools.

11. The method of claim 1, wherein the report is generated by the platform by performing a reference call to a repository storing one or more identifiers each of which is associated with one or more security tools, the reference call performing a comparison between a generated identifier associated with the component and the one or more identifiers of the repository.

12. The method of claim 1, wherein the report is generated by the platform by performing a reference call to a repository storing one or more identifiers each of which is associated with one or more security tools, the reference call performing a comparison between a generated identifier associated with the software container and the one or more identifiers of the repository.

13. The method of claim 1, wherein the report is generated by the platform by performing a reference call to a repository storing one or more identifiers each of which is associated with one or more security tools, the reference call performing a comparison between a generated identifier associated with the software container and the one or more identifiers of the repository, decreasing the score if the generated identifier does not match with at least one of the one or more identifiers in the repository.

14. The method of claim 1, wherein the report is generated by the platform by performing a reference call to a repository storing one or more identifiers each of which is associated with one or more security tools, the reference call performing a comparison between a generated identifier associated with the software container and the one or more identifiers of the repository, increasing the score if the generated identifier matches at least one of the one or more identifiers in the repository.

15. A system, comprising:

a data storage facility configured to store data associated with a software container and a component of the software container, the data being retrieved in response to a query transmitted from a platform to the data storage facility; and a logic module configured to receiving at a platform in response to a query, an artifact associated with a software container, to parse the artifact to identify source code of the software container and a supply chain, to rewrite a filesystem of the software container to include verification information for each component of the software container, the verification information being used to validate data integrity of the software container executed in a runtime environment, to invoke a scoring engine configured to generate a score associated with at least one component of the software container and an aggregate score of the software container, either the score or the aggregate score, or both, being determined as a function of whether data in the software container is modified in which the data integrity of the software container is compromised, the aggregate score being based on a security tool being included with the software container, and to generate a report from the platform, the report being associated with the software container and the report including an attestation comprising the score and the aggregate score.

16. The system of claim 15, wherein the logic module is configured to identify a compromise in the software container by comparing an algorithmically-generated identifier associated with the software container to another identifier in a repository, the another identifier being a known compromise indicator.

17. The system of claim 15, wherein the attestation is automatically-generated by the platform when a reference lookup data operation is performed by the platform against a repository, the reference lookup data operation being performed to identify a security threat to the software container.

18. The system of claim 15, wherein the attestation comprises a numerical value associated with the software container, the numerical value being indicative of a security state of the software container.

19. The system of claim 15, wherein the report further comprises a certification with the attestation, the certification comprising data used to determine a security state of the software container and the component.

20. A non-transitory computer readable medium having one or more computer program instructions configured to perform a method, the method comprising:

receiving at a platform in response to a query, an artifact associated with a software container;

parsing the artifact to identify source code of the software container and a supply chain;

rewriting a filesystem of the software container to include verification information for each component of the software container, the verification information being used to validate data integrity of the software container executed in a runtime environment;

invoking a scoring engine configured to generate a score associated with at least one component of the software container and an aggregate score of the software container, the aggregate score being based on a security tool being included with the software container, either the score or the aggregate score, or both, being determined as a function of whether data in the software container is modified in which the data integrity of the software container is compromised; and generating a report from the platform, the report being associated with the software container and the report including an attestation comprising the score and the aggregate score.

\* \* \* \* \*